US008986099B2

(12) United States Patent
Fujisawa et al.

(10) Patent No.: US 8,986,099 B2
(45) Date of Patent: Mar. 24, 2015

(54) GAMING MACHINE WITH BONUS GAME AND METHOD OF CONTROLLING SAME

(75) Inventors: Masumi Fujisawa, Koto-ku (JP); Kenta Kitamura, Koto-ku (JP); Shintarou Okazawa, Koto-ku (JP); Kenji Enokido, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 28 days.

(21) Appl. No.: 13/068,864

(22) Filed: Jun. 15, 2011

(65) Prior Publication Data

US 2012/0322538 A1 Dec. 20, 2012

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.
CPC .................................. *G07F 17/3267* (2013.01)
USPC .................................. 463/20; 463/16; 463/25

(58) Field of Classification Search
CPC ......................... G07F 17/3244; G07F 17/3258
USPC ....................... 463/16–20, 25, 29–31, 40–43; 273/138.1, 139
See application file for complete search history.

(56) References Cited

U.S. PATENT DOCUMENTS

| | | | | |
|---|---|---|---|---|
| 7,578,736 | B2 | 8/2009 | Baerlocher et al. | |
| 2003/0119580 | A1* | 6/2003 | McClintic et al. | 463/25 |
| 2004/0082376 | A1* | 4/2004 | Baerlocher et al. | 463/16 |
| 2004/0185927 | A1* | 9/2004 | Baerlocher et al. | 463/16 |
| 2005/0026669 | A1* | 2/2005 | Nelson et al. | 463/16 |
| 2009/0042634 | A1* | 2/2009 | Cannon et al. | 463/17 |
| 2009/0104973 | A1* | 4/2009 | Kato | 463/20 |
| 2009/0186692 | A1 | 7/2009 | Thomas et al. | |
| 2010/0190546 | A1* | 7/2010 | Baerlocher et al. | 463/20 |

* cited by examiner

*Primary Examiner* — Milap Shah
(74) *Attorney, Agent, or Firm* — KMF Patent Services, PLLC; S. Peter Konzel; Kenneth M. Fagin

(57) ABSTRACT

In a gaming machine of the present invention, when a base game run in a main control process shifts to a pickup bonus game, a player is able to select any of a plurality of lotus images 210 displayed in a selection screen 209 on a lower image display panel 141. In the pickup bonus game, a plurality of lotus images 210 and a plurality of objects (white orb 231, blue orb 232, red orb 233, green orb 234, END 235, or the like) are randomly associated with one another. After making a selection a plurality of number of times through the control panel 30 or the touch panel 114, a pickup bonus game payout table 192 storing a payout for each type and the number of objects is read out from the RAM 73, and a payout is determined according to the table. The payout thus determined is then awarded.

8 Claims, 18 Drawing Sheets

BUTTON LAYOUT

FIG.6

| | FIRST VIDEO REEL | SECOND VIDEO REEL | THIRD VIDEO REEL | FOURTH VIDEO REEL | FIFTH VIDEO REEL |
|---|---|---|---|---|---|
| CODE No. | SYMBOL | SYMBOL | SYMBOL | SYMBOL | SYMBOL |
| 00 | CURRENCY | DRESS | EMPEROR | A | Q |
| 01 | 9 | A | J | BONUS | 10 |
| 02 | DRAGON | 10 | CASTLE | CURRENCY | BONUS |
| 03 | A | WILD | DRESS | DRESS | A |
| 04 | DRESS | Q | Q | 9 | J |
| 05 | 10 | CASTLE | DRAGON | EMPEROR | WILD |
| 06 | EMPEROR | 9 | 9 | 9 | WILD |
| 07 | EMPEROR | CURRENCY | CASTLE | DRESS | DRAGON |
| 08 | 10 | EMPEROR | DRESS | J | J |
| 09 | J | Q | WILD | A | DRESS |
| 10 | CASTLE | DRESS | 9 | DRAGON | A |
| 11 | 9 | 9 | Q | 9 | EMPEROR |
| 12 | J | CASTLE | CURRENCY | DRESS | 10 |
| 13 | DRAGON | A | A | CASTLE | Q |
| 14 | BONUS | CURRENCY | BONUS | CURRENCY | CASTLE |
| 15 | A | BONUS | 10 | BONUS | Q |
| 16 | WILD | CURRENCY | A | 10 | CURRENCY |
| 17 | Q | 10 | CURRENCY | Q | 9 |
| 18 | DRESS | DRAGON | 9 | J | DRESS |
| 19 | CURRENCY | Q | 10 | WILD | CURRENCY |
| 20 | CASTLE | J | Q | Q | 9 |
| 21 | Q | J | J | CURRENCY | EMPEROR |

FIG.9

191

| SIMBOL | THREE | FOUR | FIVE |
|---|---|---|---|
| J | 10 | 20 | 100 |
| Q | 10 | 20 | 100 |
| 9 | 10 | 20 | 100 |
| A | 10 | 20 | 100 |
| 10 | 20 | 50 | 200 |
| CURRENCY | 20 | 50 | 200 |
| DRESS | 20 | 50 | 200 |
| DRAGON | 30 | 60 | 300 |
| CASTLE | 30 | 100 | 400 |
| EMPEROR | 40 | 150 | 500 |
| WILD | 50 | 200 | 1000 |
| BONUS | PICKUP BONUS GAME (*) | | |

(*) REARRANGEMENT OF THREE OR MORE BONUS SYMBOLS TRIGGERS PICKUP BONUS GAME

FIG.10

192

| NUMBER OF OBJECTS / TYPE OF OBJECTS | WHITE ORB 231 | BLUE ORB 232 | RED ORB 233 | GREEN ORB 234 | END 235 | BLACK ORB 236 |
|---|---|---|---|---|---|---|
| SIX | 600 | 1200 | 1500 | 800 | – | – |
| FIVE | 400 | 200 | 150 | 300 | – | – |
| FOUR | 250 | 150 | 100 | 200 | – | – |
| THREE | 200 | 100 | 50 | 150 | – | – |
| TWO | 100 | 50 | 40 | 80 | – | – |
| ONE | 50 | 30 | 20 | 50 | 50(*1) | 100(*2) |

(*1) SELECTING "END" WILL AWARD 50 CREDIT AND ENDS LOTUS SELECTION MODE (*2) TOTAL OF EVERY PAYOUT IN PICKUP BONUS GAME PAYOUT TABLE IS AWARDED

GAMING MACHINE WITH BONUS GAME AND METHOD OF CONTROLLING SAME

BACKGROUND OF THE INVENTION

1. Field of the Invention

The present invention relates to a gaming machine having a bonus game, and a control method thereof.

2. Description of Related Art

Traditionally, there has been a gaming machine such as a slot machine which awards a bonus, when a predetermined condition is met; e.g. when a bonus symbol is stop displayed. For example, there is a gaming machine which awards game medium such as coins, when a predetermined condition is met, and there is a gaming machine which awards a special game such as a bonus game; e.g., the specification of U.S. Patent Application, publication No. 2009/0104973 and the specification of U.S. Pat. No. 7,578,736 B2).

As an example of the bonus game to be awarded, the specification of U.S. Patent Application, publication No. 2009/0186692 describes a game in which a selection screen is displayed (see FIG. 7), and a payout is awarded according to the number of elements selected (see FIG. 14*b*).

In the bonus game however, there is only one type of element to be selected, and the relation between the payout awarded and the number of elements selected is such that the payout is monotonously increased with an increase in the number of elements selected. For a player, selection making during the bonus game is monotonous. As the result, the player may lose the interest.

In view of the above problem, present invention is made and it is an object of the present invention to provide a gaming machine including a bonus game which awards a payout based on a selection made by a player, and a control method of such a gaming machine, which realizes an improved entertainment characteristic to let the player enjoy making his/her own selection during the bonus game.

SUMMARY OF THE INVENTION

To achieve the above object, an aspect of the present invention is as follows.

(1) A gaming machine including: a display device which displays a plurality of selection objects in a pickup bonus game;

a storage device which stores a plural sets of payout data respectively associated with the number of objects;

an input device which enables an input of an instruction; and a controller programmed to executes the following processes of:

(a1) running a base game in response to an input via the input device, (a2) in the base game run in (a1), determining whether or not a condition for occurrence of the pickup bonus game is satisfied;

(a3) displaying the selection objects on the display device, when it is determined in (a2) that the condition for occurrence of the pickup bonus game is determined as to be satisfied;

(a4) randomly associating any of the objects with each of the selection objects;

(a5) receiving a predetermined number of times an input of selection of any of the selection objects displayed on the display device through the input device, the predetermined number of times being more than once, and (a6) after receiving an input of selection the predetermined number of times in (a5), reading out from the storage device the payout data corresponding to the number of selected selection objects each associated with any of the objects so as to determine a payout, and awarding the payout thus determined.

In the above structure (1), when shifting from the base game to the pickup bonus game occurs, the plurality of selection objects are displayed on the display device, and any of the selection objects can be selected. In this pickup bonus game, the plurality of objects are randomly associated with the selection objects, respectively. After any of the selection objects are selected a plurality of number of times through the input device, the payout data corresponding to the number of objects associated with the selected selection objects is read out from the storage device to determine a payout. The payout determined is then awarded.

With this, in the pickup bonus game, the payout to be awarded is determined according to the number of objects selected. The player is able to enjoy the pickup bonus game while paying attention to the number of objects selected.

Another aspect of the present invention is as follows.

(2) The gaming machine of the above (1), adapted so that the objects include a plural types of objects which are visibly identifiable images and are displayed on the display device after (a5), and for each of the types of the objects, the payout data is set so that a value related to a payout varies depending on the number of the same type of objects selected;

the payout data is such that a payout increases with an increase in the number of the same type of objects selected;

even when a payout for selecting a particular number of one type of objects is lower than a payout for selecting the same number of another type of objects, a payout for selecting another particular number of the one type of objects is higher than a payout for selecting the other particular number of the other type of objects, the other particular number being greater than the particular number.

In the above structure, the payout based on the payout data is set so as to increase with the number of objects selected. Further, for each type of the objects, the payout data is set so that the value related to payout varies according to the number of objects selected. For example, suppose the particular number is two, and a payout amount for selecting two objects of type A (100 credit) is lower than a payout amount for selecting two objects of type B (200 credit). The payout data however may be set so that, when the number of selected objects of type A is five which is greater than the particular number, a payout amount (1000 credit) is higher than a payout amount awarded for selecting five objects of type B (500 credit).

Thus, suppose the player selects one type of object and a payout awarded for selecting the predetermined number of that one type of objects is less than a payout awarded for selecting the same number of another type of objects. In this case, if the player selects more of that one type of objects and the number of that type of objects selected reaches the above mentioned other particular number which is greater than the above mentioned particular number, the player is able to win a payout which is higher than the payout awarded for selecting the other particular number of the other type of objects. Therefore, when selecting the selection objects, even if a payout awarded for the number of objects selected is low at one point, selecting more of the same type of objects could lead to a higher payout. The player therefore is still able to enjoy the pickup bonus game with an expectation for a higher payout. Further, the amount of increase in the payout varies depending on the type of objects. Therefore, there are a plurality of ways in which the player is motivated to select the selection objects, and the player is able to play the pickup bonus game with an enhanced expectation.

Yet another aspect of the present invention is as follows.

(3) The gaming machine of the above (1), adapted so that the objects includes a special object;

the controller further executes the following process of when the special object is selected in (a5), the payout data for all the types and the number of the objects associated with the selection object are read out from the storage device, and all values related to the payout in the payout data read out are added up and awarded as a payout.

In the structure, when the special object is selected, the payout data for all the types and the number of the objects associated with the selection object are read out from the storage device, and all values related to the payout in the payout data read out are added up and awarded as a payout.

As such, selecting the special object will yield a high payout. Therefore, the player is able to enjoy the pickup bonus game with a hope for selecting the special object every time he/she makes his/her selection.

Yet another aspect of the present invention is as follows.

(4) The gaming machine of the above (2), adapted so that in (a6), the payout data is read out from the storage device to calculate a payout for the type and the number of objects selected for each type of objects, and a total of payouts of each type of objects are added up with totals of the other types of objects to determine a net total payout, and the net total payout is award.

In the structure, if there are more than one type of objects, a payout data for each number of objects are read out from the storage device and added up for each type of the objects. The total payout of each type of object is then added up with the total payouts of the other types to determine a net total payout. The net total payout is then awarded.

This way, even if more than one type of objects are selected, the player is able to obtain a payout for each type of objects according to the number of the same objects. The player is able to enjoy the pickup bonus game with an expectation for a high payout.

Yet another aspect of the present invention is as follows.

(5) A control method which is implemented in a gaming machine through:

a display device which displays a plurality of selection objects in a pickup bonus game;

a storage device which stores a plural sets of payout data respectively associated with the number of objects;

an input device which enables an input of an instruction; and a controller, the method including the controller-executed steps of:

(b1) running a base game in response to an input via the input device, (b2) in the base game run in (a1), determining whether or not a condition for occurrence of the pickup bonus game is satisfied;

(b3) displaying the selection objects on the display device, when it is determined in (a2) that the condition for occurrence of the pickup bonus game is determined as to be satisfied;

(b4) randomly associating any of the objects with each of the selection objects;

(b5) receiving a predetermined number of times an input of selection of any of the selection objects displayed on the display device through the input device, the predetermined number of times being more than once, and (b6) after receiving an input of selection the predetermined number of times in (a5), reading out from the storage device the payout data corresponding to the number of selected selection objects each associated with any of the objects so as to determine a payout, and awarding the payout thus determined.

In the above method, when shifting from the base game to the pickup bonus game occurs, the plurality of selection objects are displayed on the display device, and any of the selection objects can be selected. In this pickup bonus game, the plurality of objects are randomly associated with the selection objects, respectively. After any of the selection objects are selected a plurality of number of times through the input device, the payout data corresponding to the number of objects associated with the selected selection objects is read out from the storage device to determine a payout. The payout determined is then awarded.

With this, in the pickup bonus game, the payout to be awarded is determined according to the number of objects selected. The player is able to enjoy the pickup bonus game while paying attention to the number of objects selected.

BRIEF DESCRIPTION OF THE DRAWINGS

FIG. 6 is an explanatory diagram of a symbol column on each video reel of the slot machine of the embodiment.

FIG. 9 is an explanatory diagram of a payout determination table of the embodiment.

FIG. 10 is an explanatory diagram of a pickup bonus game payout table, related to the embodiment.

DESCRIPTION OF THE PREFERRED EMBODIMENTS

The following describes an embodiment of the present invention with reference to attached drawings.

Figure 1:
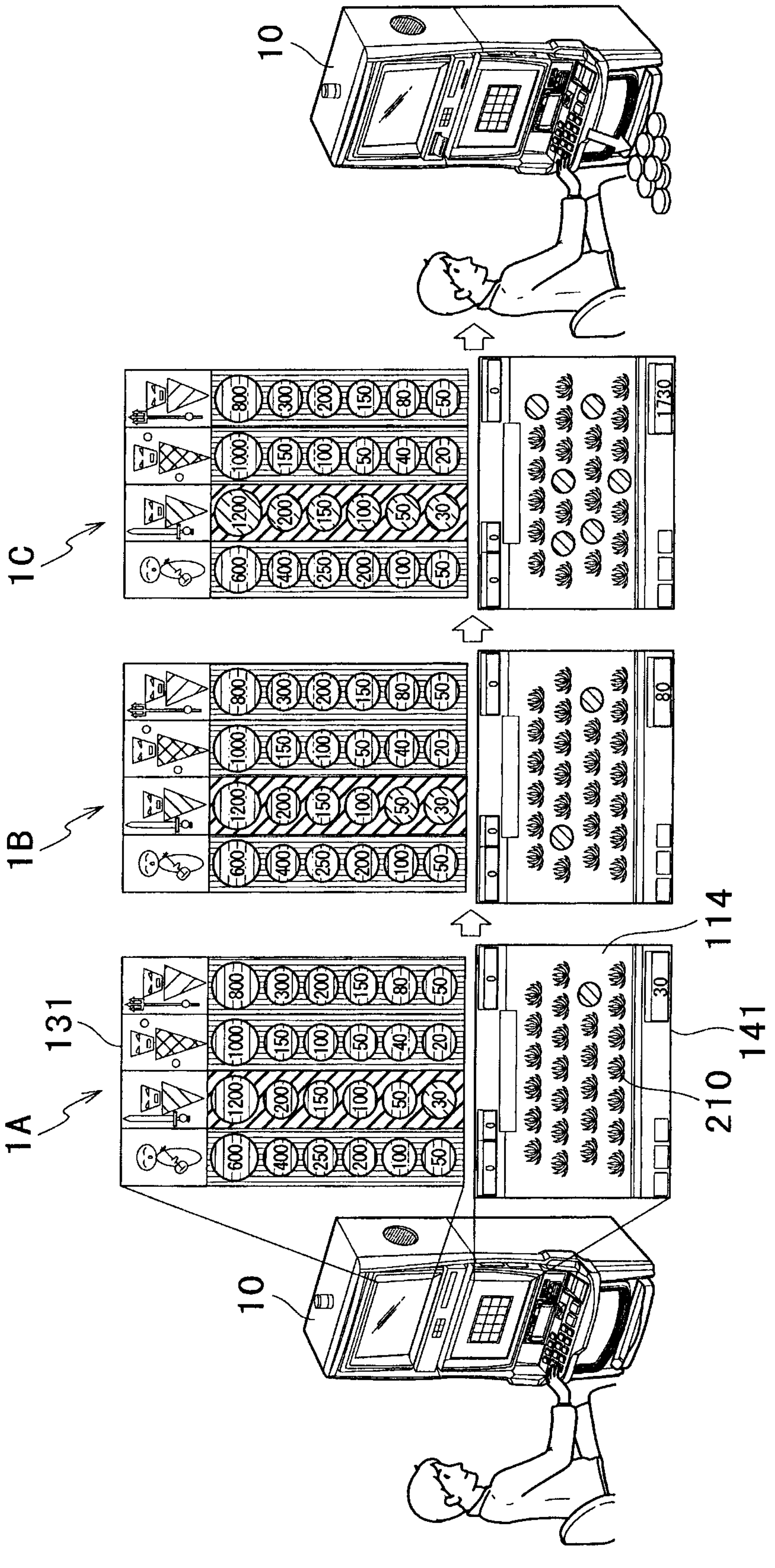
FIG. 1 is an explanatory diagram providing an overview of a slot machine game of one embodiment.

A slot machine 10 (gaming machine) of the present invention includes: a lower image display panel 141 (display device) which displays a plurality of lotus images 210 (selection objects) in a pickup bonus game (see 1A of FIG. 1); A RAM 73 (storage device) which stores a pickup bonus game payout table 192 (containing payout data) which defines a payout for the number of objects such as blue orbs 232; a control panel 30 and/or a touch panel 114 (input device) which enable(s) input of instructions; and a motherboard 70 (controller) programmed to execute the following processes of:

(a1) running a base game in response to an input via the control panel 30 and/or the touch panel 114 during the main control process;

(a2) in the base game, determining whether or not three or more "BONUS" symbols are displayed on a display window 150, which is a condition for occurrence of the pickup bonus game;

(a3) displaying the plurality of lotus images 210 on the lower image display panel 141, when the condition for occurrence of the pickup bonus game is determined as to be satisfied;

(a4) randomly associating any of the objects (white orb 231, blue orb 232, red orb 233, green orb 234 or the like) with each of the lotus images 210;

(a5) receiving a predetermined number of times an input of selection of any of the lotus images 210 displayed on the lower image display panel 141 through the touch panel 114, the predetermined number of times being more than once (see 1A, 1B, 1C of FIG. 1);

(a6) after receiving an input of selection the predetermined number of times in (a5), reading out from the RAM 73 a pickup bonus game payout table 192 corresponding to the number of selected lotus images 210 each associated with any of the white orb 231 so as to determine a payout, the blue orb 232, the red orb 233, or the green orb 234 (objects), and awarding the payout thus determined (1C of FIG. 1).

(Explanation of Function Flow Diagram)

Figure 2:
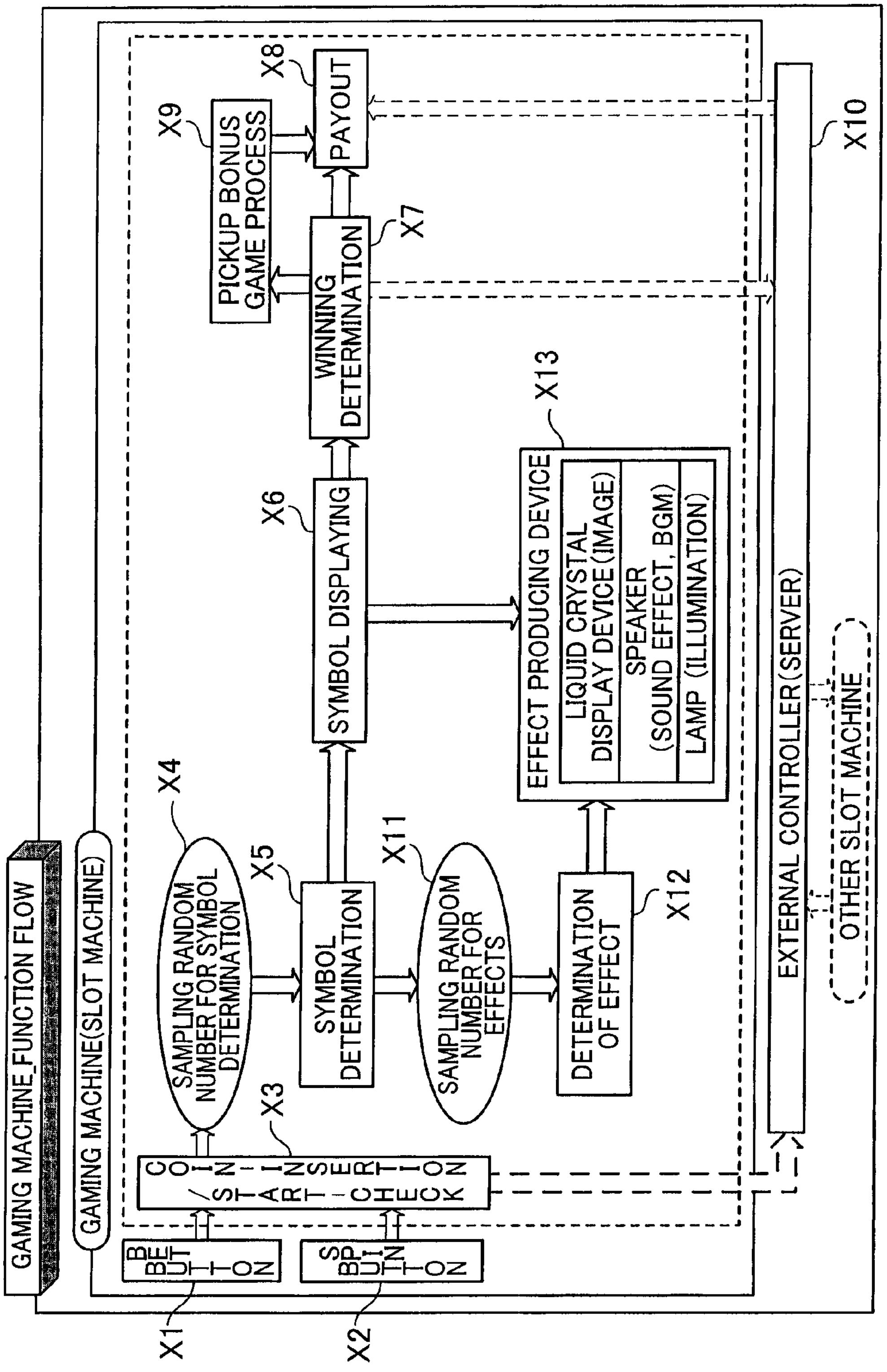
FIG. 2 is a diagram showing a function flow of the gaming machine of the present invention.

The following describes basic functions of the gaming machine of the present invention, with reference to FIG. 2.

(Coin-Insertion/Start-Check)

First, the gaming machine checks whether or not a BET button X1 has been pressed by a player, and subsequently checks whether or not a start button X2 has been pressed by the player (X3).

(Symbol Determination)

Next, when the start button X2 is pressed by the player, the gaming machine samples a random number for symbol determination (X4), and determines, for each of the plurality of video reels displayed on a liquid crystal display device, which symbol will be displayed when the scroll of the symbol column is stopped (X5).

(Symbol Display)

Next, the gaming machine 1 starts scrolling of the symbol column of each of the video reels and then stops scrolling so that the determined symbols are displayed for the player (X6).

(Winning Determination)

When scrolling of the symbol column of each video reel has been stopped, the gaming machine 1 determines whether or not a combination of symbols displayed for the player is a combination related to winning (X7).

(Payout)

When the combination of symbols displayed to the player is a combination related to winning, the gaming machine awards a benefit according to the combination to the player (X8). For example, when a combination of symbols related to a payout of coins has been displayed, the gaming machine pays out coins of the number corresponding to the combination of symbols to the player.

Further, in the gaming machine, a pickup bonus game process (X9) is executed when a pickup bonus game trigger is met in the winning determination of X7. The coins having won in the pickup bonus game are also paid out (X8).

Note that the gaming machine may be structured to calculate for each game an amount (accumulation amount) to be accumulated as an amount of jackpot, and transmit the amount to the external controller X10. Further, the external controller may accumulate, as the amount of jackpot, an accumulation amount having been transmitted from each gaming machine.

(Effect Determination)

The gaming machine provides various effects by (various effect devices) displaying an image on the liquid crystal display device, illumination using the lamp, and/or outputting a sound from the speaker (X13). The gaming machine extracts a random value for effect (X11) and determines contents of the effects based on the symbols and the like randomly determined (X12).

(Entire Gaming System)

Next, the following describes a gaming system including a slot machine 10 to which the gaming machine of the present invention is applied.

The gaming system includes a plurality of slot machines 10 and an external controller connected to the slot machines 10 via a communication line (not-shown).

The external controller controls the plurality of slot machines 10. For example, the external controller is a hall server installed in a gaming facility having the slot machines 10. Each of the slot machines 10 has a unique identification number, and the external controller identifies which one of the slot machines 10 transmitted data, by referring to the identification number. Further, when transmitting data from the external controller to any of the slot machines 10, the identification number is used for designating the transmission destination.

It is to be noted that the gaming system may be constructed within a single gaming facility where various games can be performed, such as a casino, or may be constructed among a plurality of gaming facilities. Further, when the gaming system is constructed in a single gaming facility, the gaming system may be constructed in each floor or section of the gaming facility. The communication line may be a wired or wireless line, and can adopt a dedicated line, an exchange line or the like.

(Overall Structure of Slot Machine 10)

Figure 3:
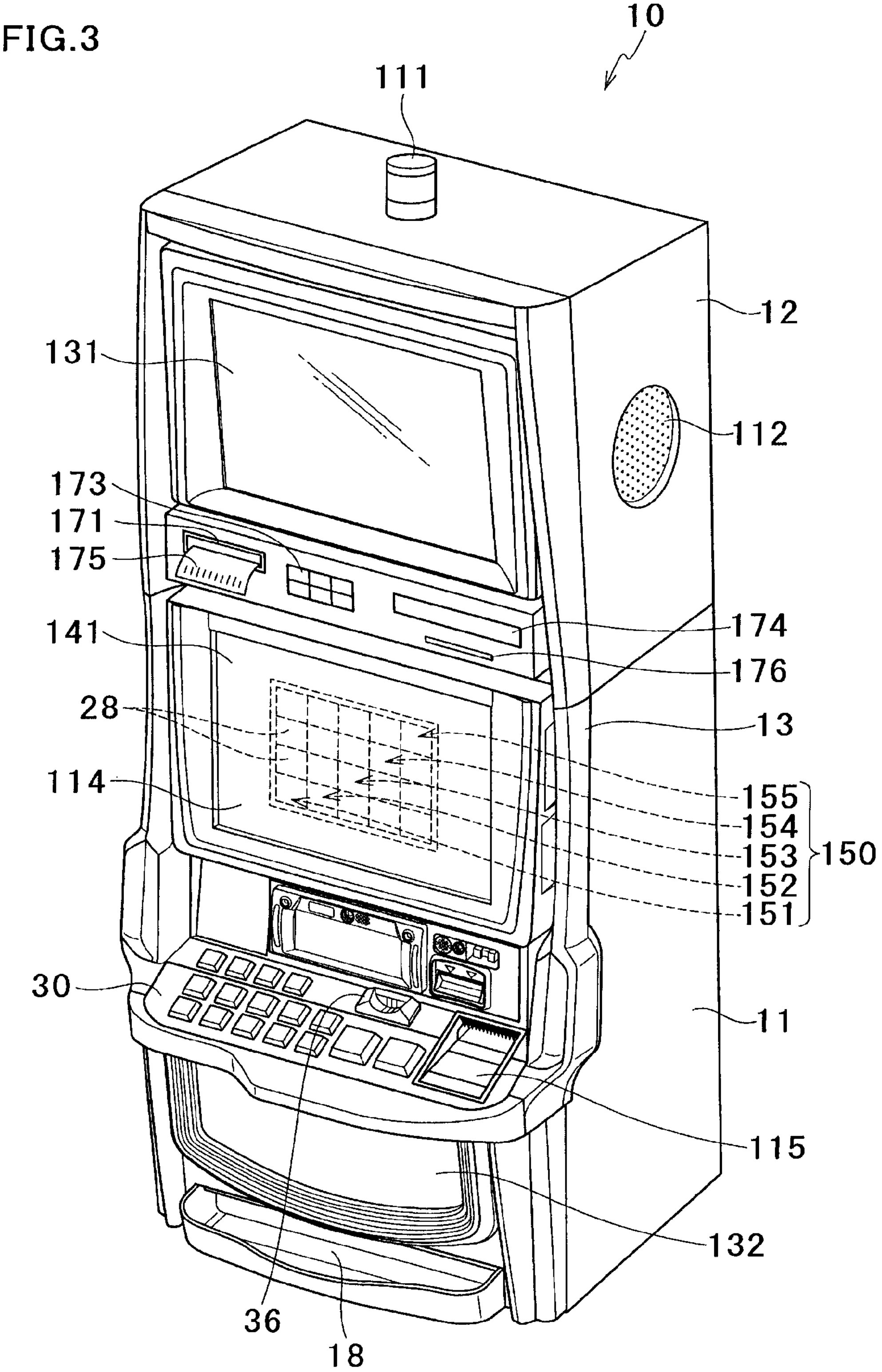
FIG. 3 shows the entire structure of the slot machine of the embodiment.
Figure 4:
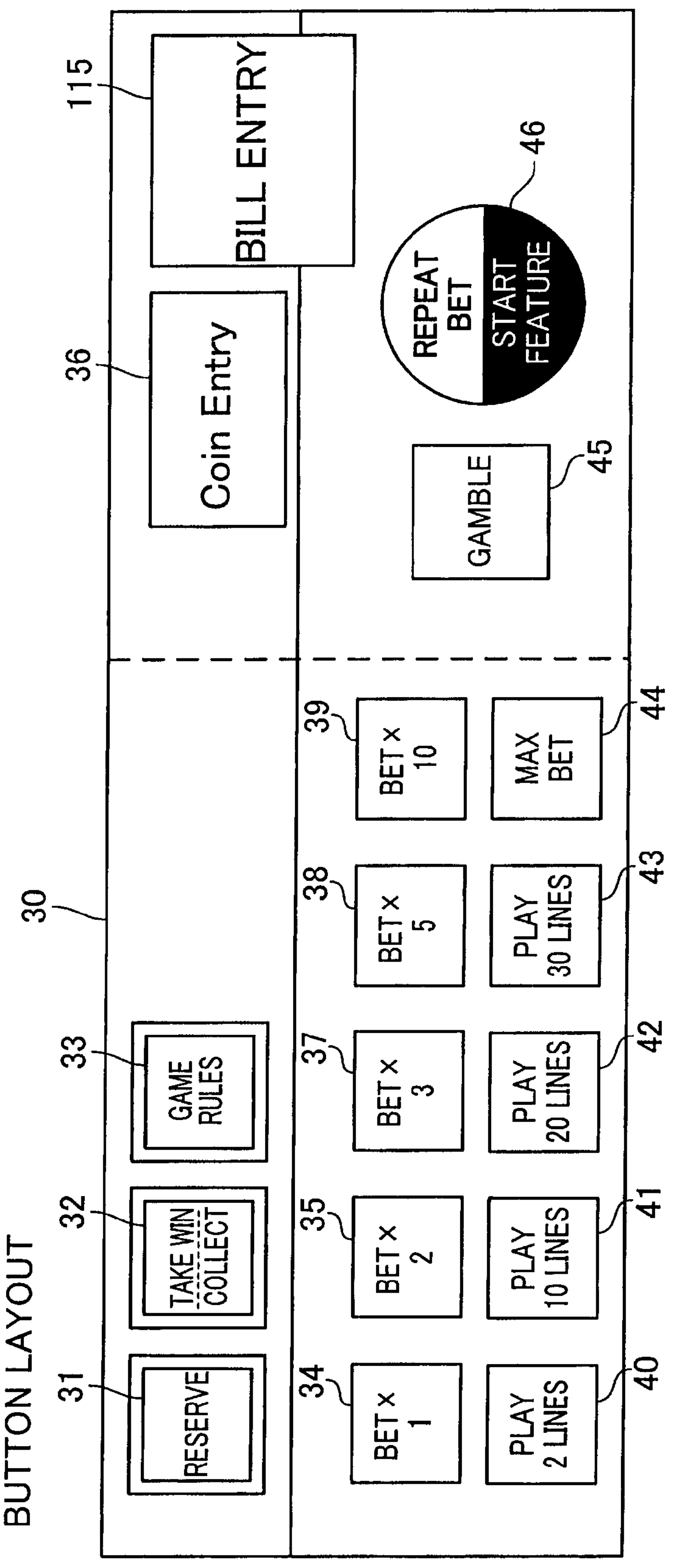
FIG. 4 shows a control panel of the slot machine of the embodiment.

Next, with reference to FIG. 3 and FIG. 4, the following describes an overall structure of the slot machine 10.

A coin, a bill, or electrically valuable information corresponding to these is used as a game medium in the slot machine 10. Further, in the present embodiment, a later-described ticket with a barcode is also used. It is to be noted that the game medium is not limited to these, and for example a medal, a token, electronic money or the like can be adopted.

Each slot machine 10 includes a cabinet 11, a top box 12 provided above the cabinet 11, a main door 13 provided to the front surface of the cabinet 11.

A lower image display panel 141 is provided at the center of the main door 13. The lower image display panel 141 is formed of a transparent liquid crystal panel. A screen displayed on the lower image display panel 141 has a display window 150 at its center. The display window 150 includes twenty display blocks 28 which are arranged in five columns and four rows. The columns form video reels 151 to 155, each having four display blocks 28. The four display blocks 28 in each of the video reels 151 to 155 are displayed as if all the display blocks 28 are moving downward at various speed. This enables rearrangement, in a manner that symbols respectively displayed in the display blocks 28 are rotated in a longitudinal direction and stopped thereafter.

Figure 7:
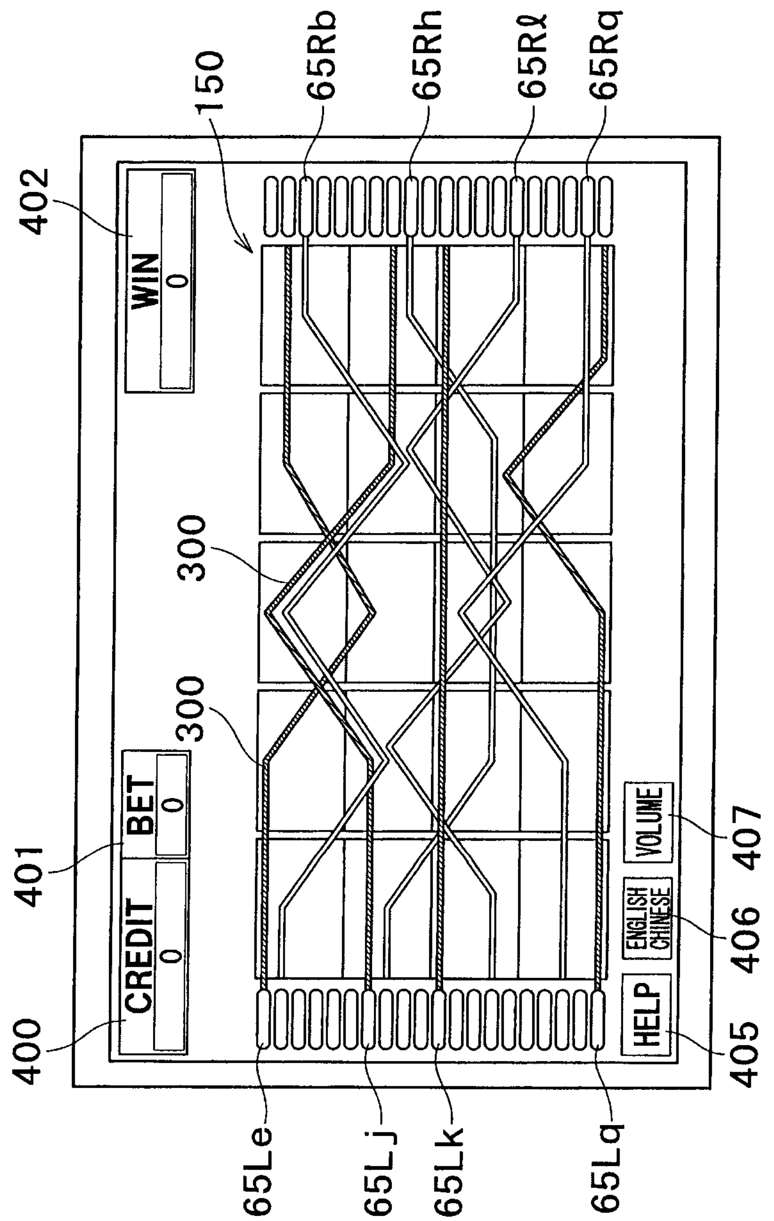
FIG. 7 is an explanatory diagram of an image displayed on a lower image display panel of the slot machine of the embodiment.
Figure 8:
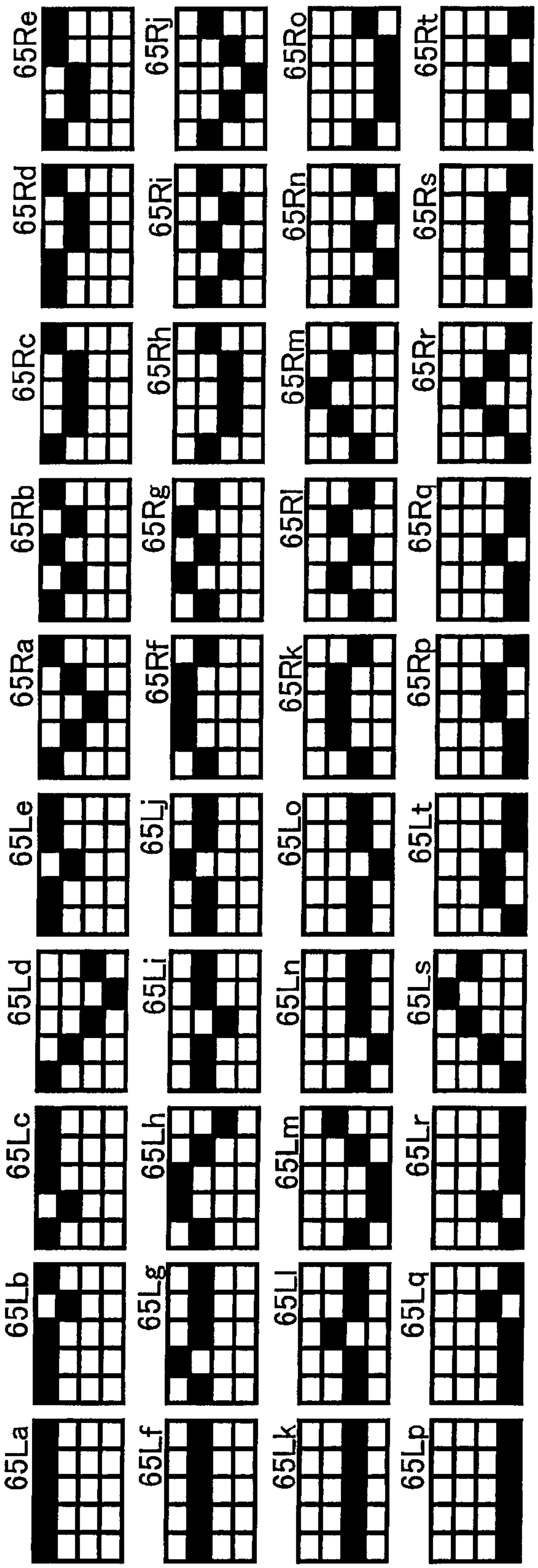
FIG. 8 is an explanatory diagram showing paylines related to the embodiment.

Here, as shown in FIG. 7 and FIG. 8, on the left and right sides of the display window 150 displayed on the lower image display panel 141 are symmetrically arranged payline occurrence columns. The payline occurrence column on the player's left includes 20 payline occurrence parts 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, 65LS, 65Lt, and the paylines not shown in the figure).

On the other hand, the payline occurrence column on the right side include 20 payline occurrence parts 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, 65Rs, 65Rt, and the paylines not shown in the figure).

The payline occurrence parts 65L and the payline occurrence parts 65R form a total of 40 paylines 300, as shown in FIG. 7 and FIG. 8.

The number of active paylines 300 is determined based on an operation of a 1-bet button 34, a 2-bet button 35, a 3-bet button 37, a 5-bet button 38, a 10-bet button 39, a play-2-lines button 40, a play-10-lines button 41, a play-20-lines button 42, a play-30-lines button 43, a max lines button 44 on a later-described control panel 30. When the max lines button 44 is selected, the maximum number of paylines 300; i.e., 40 paylines 300 are activated. An activated payline 300 results in various types of winning for each symbol.

Further, a not-illustrated touch panel 114 is disposed on a front surface of the lower image display panel 141, and a player is able to input various instructions by operating the touch panel 114. From the touch panel 114, an input signal is transmitted to the main CPU 71.

As shown in FIG. 3 and FIG. 4, below the lower image display panel 141 are provided various buttons on the control panel 30 (input device), a coin entry 36 which guides coins into the cabinet 11, and a bill entry 115.

The control panel 30 includes: a reserve button 31, a collect button 32, and a game rule button 33 arranged in the left side area of the upper stage; a 1-bet button 34, a 2-bet button 35, a 3-bet button 37, a 5-bet button 38, a 10-bet button 39, a play-2-lines button 40, a play-10-lines button 41, a play-20-lines button 42, a play-30-lines button 43, and a max line button 44 in the left side area of the lower stage. Further, a coin entry 36 and a bill entry 115 for accepting bills or the like are arranged in the right side area of the upper stage, and a gamble button 45 and a start button 46 are arranged in the right side area of the lower stage.

The reserve button 31 is an operation button to be used when temporarily leaving the seat, or when requesting a staff member of the gaming facility for an exchange. The collect button 32 is an operation button used for outputting the coins kept inside the slot machine 10 to the coin tray 18. A game rule button 33 is pressed when the operating method of a game is unclear. When the game rule button 33 is pressed, various types of help information are displayed on the upper image display panel 131 and the lower image display panel 141.

A 1-bet button 34 is arranged so that, each time the button is pressed, one gaming medium is bet on each active payline from the current credit owned by the player. A 2-bet button 35 is pressed to start a game on condition that two gaming media are bet on each active payline. A 3-bet button 37 is pressed to start a game on condition that three gaming media are bet on each active payline. A 5-bet button 38 is pressed to start a game on condition that five gaming media are bet on each active payline. A 10-bet button 39 is pressed to start a game on condition that ten gaming media are bet on each active payline. Thus, the bet amount on each payline is determined by pressing of the 1-bet button 34, the 2-bet button 35, the 3-bet button 37, the 5-bet button 38, and the 10-bet button 39.

A play-2-lines button 40 activates paylines when pressed. In this case, the number of paylines to be activated is 2. A play-10-lines button 41 activates paylines when pressed. In this case, the number of paylines to be activated is 10. A play-20-lines button 42 activates paylines when pressed. In this case, the number of paylines to be activated is 20. A play-30-lines button activates paylines when pressed. In this case, the number of paylines to be activated is 30. A MAX-lines button 44 activates paylines when pressed. In this case, the number of paylines to be activated is maximum (40).

The gamble button 45 is an operation button for causing shifting to a gamble game after an end of the pickup bonus game or the like. The gamble game here means a game run by using credit the player has won.

The start button 46 is a button for starting scroll of the video reels 151 to 155.

The coin entry 36 is for accepting coins into the cabinet 11. The bill entry 115 validates a bill, and accepts a valid bill into the cabinet 11. Further, the lower front surface of the main door 13, i.e., the lower portion of the control panel 30, has a belly glass 132 on which a character of the slot machine 10 or the like is drawn, and a coin tray 18 for receiving coins output from inside the cabinet 11.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The slot machine 10 produces effects by displaying images, outputting sounds, and outputting the light.

A data display 174, and a keypad 173 are provided on the lower side of the upper image display panel 131. The data display 174 includes a fluorescent display, LEDs and the like, and displays the data inputted by the player via the keypad 173, for example. The keypad 173 is for inputting data.

(Symbol Column)

Next, with reference to FIG. 6, a configuration of the symbol columns included in the video reels 151-155 of the slot machine 10 is described.

The base game symbol table of FIG. 6 shows arrangements of symbols displayed on the video reels. A first video reel 151, a second video reel 152, a third video reel 153, a fourth video reel 154, and a fifth video reel 155 each is assigned with a symbol column consisting of 22 symbols that correspond to respective code numbers from "00" to "21".

As the symbols, there are "J", "Q", "9", "A", "10", "CURRENCY" 161, "DRESS" 162, "DRAGON" 163, "CASTLE" 164, "EMPEROR" 165, "WILD" 166, and "BONUS" 167, as shown in FIG. 6.

(Structures of Circuits Provided to Slot Machine 10)

Figure 5:
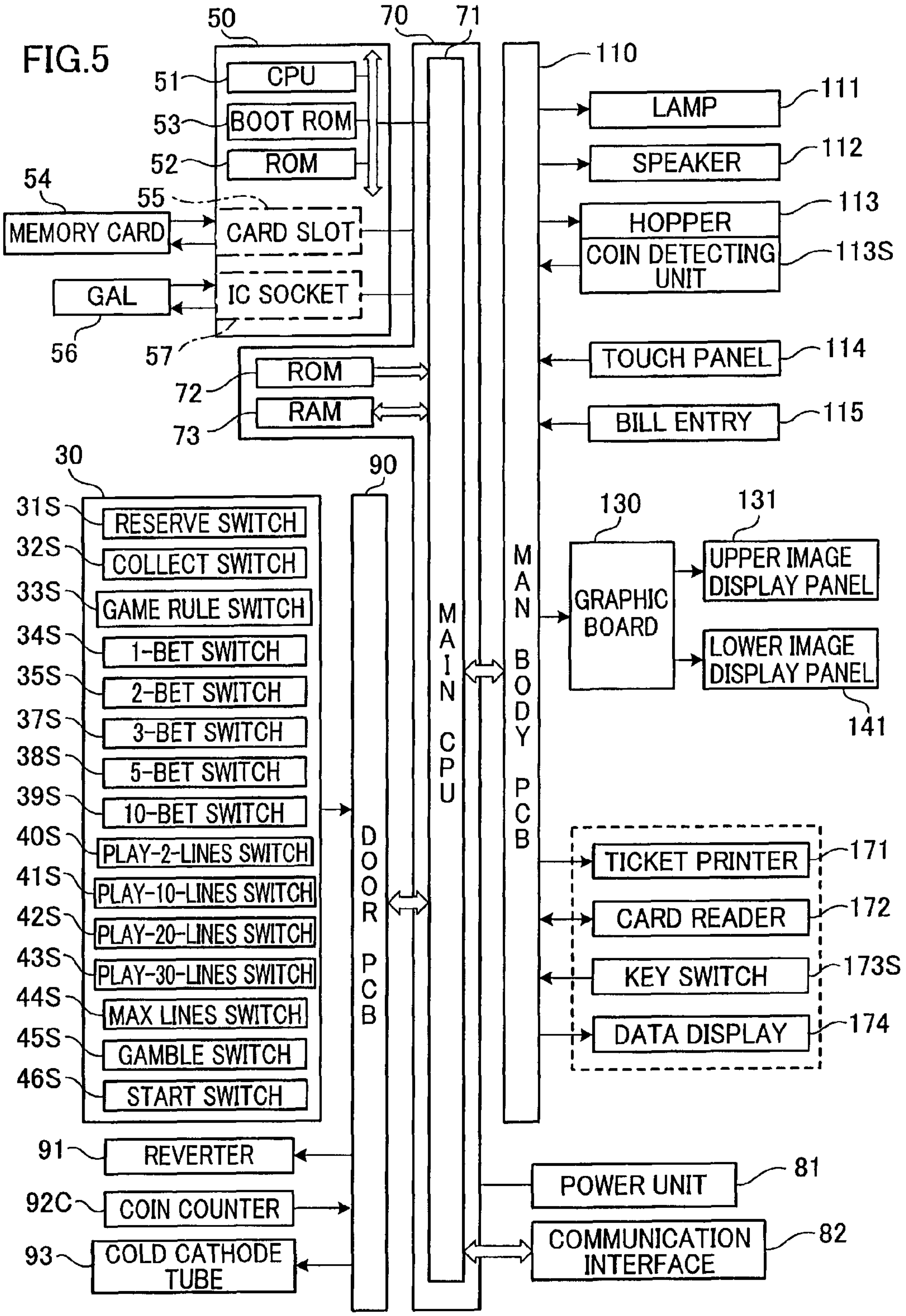
FIG. 5 is a block diagram showing an internal structure of the slot machine of the embodiment.

Next, with reference to FIG. 5, a configuration of a circuit included in the slot machine 10 is described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a involatile memory, and stores a game program and a game system program. The game program includes a program related to game progression, a random determination program, and a program for producing effects by images and sounds. Further, in the game program is included data of a symbol table regulating the sequence of symbols for each of the video reels 151 to 155, a payout determination table 191, and a pickup bonus game payout table 192.

The random determination program is a program for randomly determining to-be stopped symbol of each of the video reels 151-155. The to-be stopped symbol is data for determining four symbols to be displayed to the display window 150 out of the 22 symbols forming each symbol column. The slot machine 10 of the present embodiment determines as the to-be stopped symbol the symbol to be displayed in a predetermined area (e.g. the uppermost stage) out of the four areas provided for each of the video reels 151-155 of the display window 150.

The aforementioned random determination program includes symbol determination data. The symbol determination data is data that specifies random numbers so that each of the 22 symbols (code numbers from "00" to "21") forming the symbol column is determined at an equal probability (i.e. 1/22), for each of the video reels 151-155. The probabilities of the respective 22 symbols being determined are basically equal. However, the numbers of the respective types of symbols included in the 22 symbols vary, and thus the probabilities of the respective types of symbols being determined vary. It is noted that the probabilities of the respective types of symbols may include a random number.

Further, the card slot 55 is configured so that the memory card 54 can be inserted thereinto and removed therefrom, and is connected to a motherboard 70 by an IDE bus.

The GAL 56 is a type of PLD (programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents and settings of the game to be played on the slot machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like. The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is provided with a main CPU 71, a ROM 72 (storage device), a RAM 73 (storage device), and a communication interface 82. The motherboard 70 corresponds to the controller of the present invention.

The ROM 72 includes a memory device such as a flash memory, and stores a program such as BIOS to be executed by the main CPU 71, and permanent data. When the BIOS is executed by the main CPU 71, a process for initializing predetermined peripheral devices is executed. Further, through the gaming board 50, a process of loading the game program and the game system program stored in the memory card 54 is started.

The RAM 73 stores data and programs which are used in operation of the main CPU 71. For example, when the process of loading the aforementioned game program (including the payout determination table 191, the pickup bonus game payout table 192), game system program or authentication program is executed, the RAM 73 can store the program.

The RAM 73 is provided with working areas used for operations in execution of these programs. Examples of the areas include: an area that stores counters for the number of games, the bet amount, the payout amount, the credit amount and the like; and an area that stores symbols (code numbers) randomly determined. In other words, the RAM 73 functions as a game counter, a bet amount counter, a payout amount counter, and a credit amount counter.

The communication interface 82 is for communicating with the external controller such as a server, through the communication line. Further, the motherboard 70 is connected with a later-described door PCB (Printed Circuit Board) 90 and a main body PCB 110 by respective USBs.

The motherboard 70 is also connected with a power unit 81. When the power is supplied from the power unit 81 to the motherboard 70, the main CPU 71 of the motherboard 70 is activated, and then the power is supplied to the gaming board 50 through the PCI bus so as to activate the CPU 51.

The door PCB 90 and the main body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

The control panel 30 includes: a reserve switch 31S, a collect switch 32S, a game rule switch 33S, a 1-bet switch 34S, a 2-bet switch 35S, a 3-bet switch 37S, a 5-bet switch 38S, a 10-bet switch 39S, a play-2-lines switch 40S, a play-10-lines switch 41S, a play-20-lines switch 42S, a play-30-lines switch 43S, a MAX-lines switch 44S, a gamble switch 45S, a start switch 46S, which correspond to the above described buttons, respectively. Each of the switches outputs a signal to the main CPU 71 upon detection of press of the button corresponding thereto by the player.

Inside the coin entry 36 is provided a reverter 91 and a coin counter 92C. The reverter 91 validates the legitimacy of coins inserted into the coin entry 36, and outputs those not determined as genuine coins to the coin tray 18. The coin counter 92C detects the received genuine coins and counts the number of these coins.

The cold cathode tube 93 functions as a backlight installed on the rear face sides of the upper image display panel 131 and the lower image display panel 141, and lights up based on a control signal outputted from the main CPU 71.

To the main body PCB 110 are connected the lamp 111, the speaker 112, a hopper 113, a coin detecting unit 113S, the touch panel 114, the bill entry 115, a graphic board 130, a ticket printer 171, a card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out a designated number of coins to the coin tray 18. The coin detecting unit 113S outputs a signal to the main CPU 71 upon detection of coins paid out by the hopper 113.

The touch panel 114 detects a place on the lower image display panel 141 touched by the player's finger or the like, and outputs to the main CPU 71 a signal corresponding to the detected place. Upon acceptance of a valid bill, the bill entry 115 outputs to the main CPU 71 a signal corresponding to the face amount of the bill.

The graphic board 130 controls display of images executed by the respective upper image display panel 131 and lower image display panel 141, based on a control signal outputted from the main CPU 71. The display window 150 of the lower image display panel 141 displays the five video reels 151-155 by which the scrolling and stop motions of the symbol columns included in the respective video reels 151-155 are displayed. The graphic board 130 is provided with a VDP generating image data, a video RAM temporarily storing the image data generated by the VDP, and the like.

As shown in FIG. 7, the lower image display panel 141 displays thereon: a credit amount indicator 400 indicating a credit amount stored in the RAM 73, during a base game run in the main control process; a bet amount display unit 401 which displays a bet amount stored in the RAM 73; a payout indicator 402 which displays a payout amount stored in the RAM 73; a help touch-button 405 which functions similarly to the game rule button 33; a language switching touch-button 406 which changes the language in which the messages in the images displayed on the upper image display panel 131 and the lower image display panel 141; and a sound volume touch-button 407 which adjusts the volume of the sound output from the speaker 112. The lower image display panel 141 corresponds to a display device of the present invention.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the credit amount stored in the RAM 73, date and time, the identification number of the slot machine 10, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

(Payout Determination Table)

Next, the following describes a payout determination table, with reference to FIG. 9.

The payout determination table 191 indicates a relation between an amount of credit paid out and the type of and the number of symbols rearranged on an active payline 300. Note that the payout determination table 191 is read out and referred to in a later mentioned program. In the present embodiment, rearrangement of three or more of at least one of the following types of symbols on an active payline 300 is determined as a winning: "J", "Q", "9", "A", "10", "CURRENCY", "DRESS", "DRAGON", "CASTLE", "EMPEROR", and "WILD".

Further, when three or more of the "BONUS" symbols 167 serving as trigger symbols for a pickup bonus game are rearranged on the display window 150, the "pickup bonus game trigger" is determined as the winning combination, and the game shifts to the pickup bonus game.

(Pickup Bonus Game Payout Table)

Next, the following describes a pickup bonus game payout table 192, with reference to FIG. 10.

Figure 15:
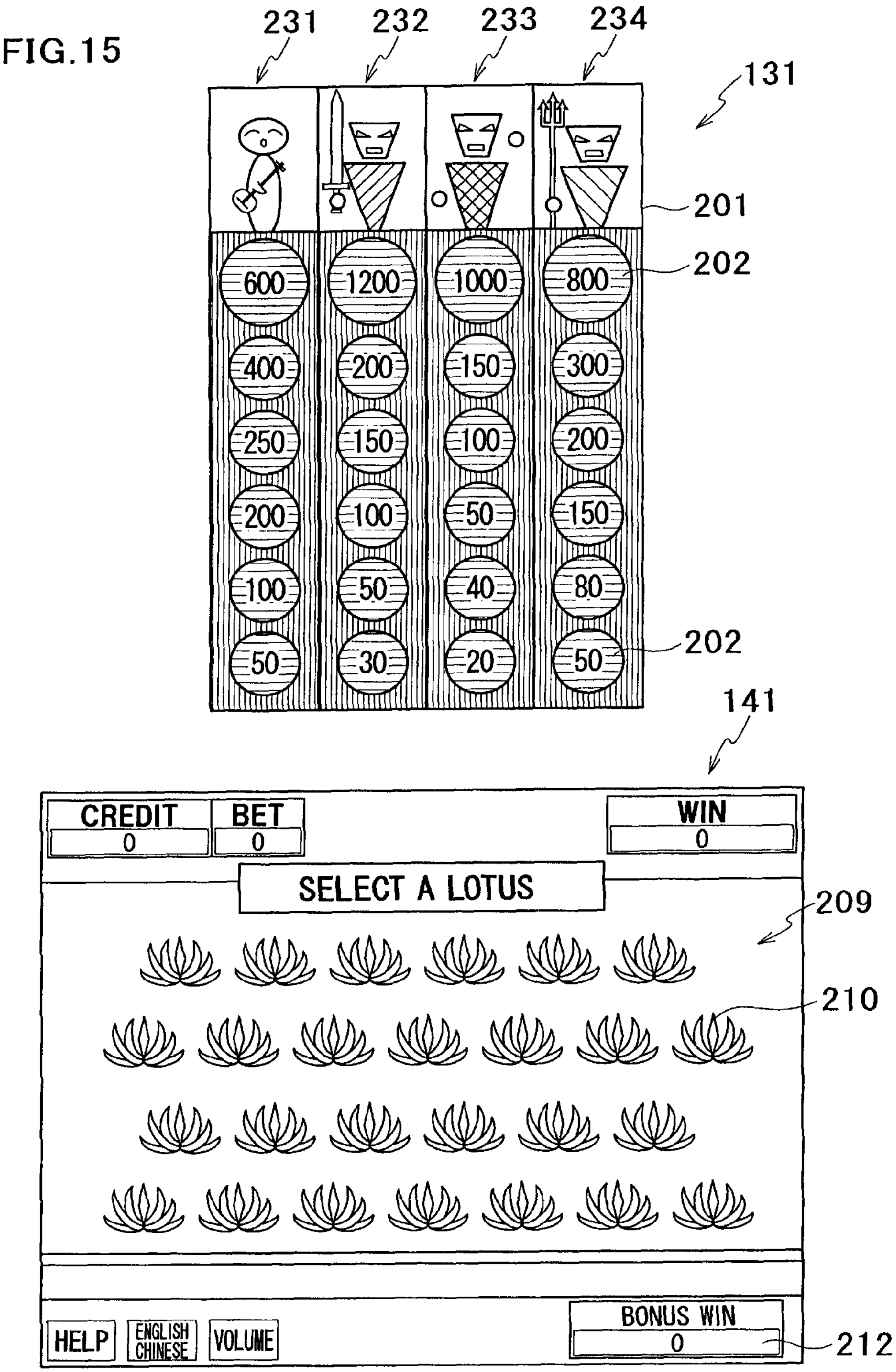
FIG. 15 is a diagram showing a selection screen displayed on the upper image display panel and the lower image display panel provided to the slot machine of the embodiment.
Figure 16:
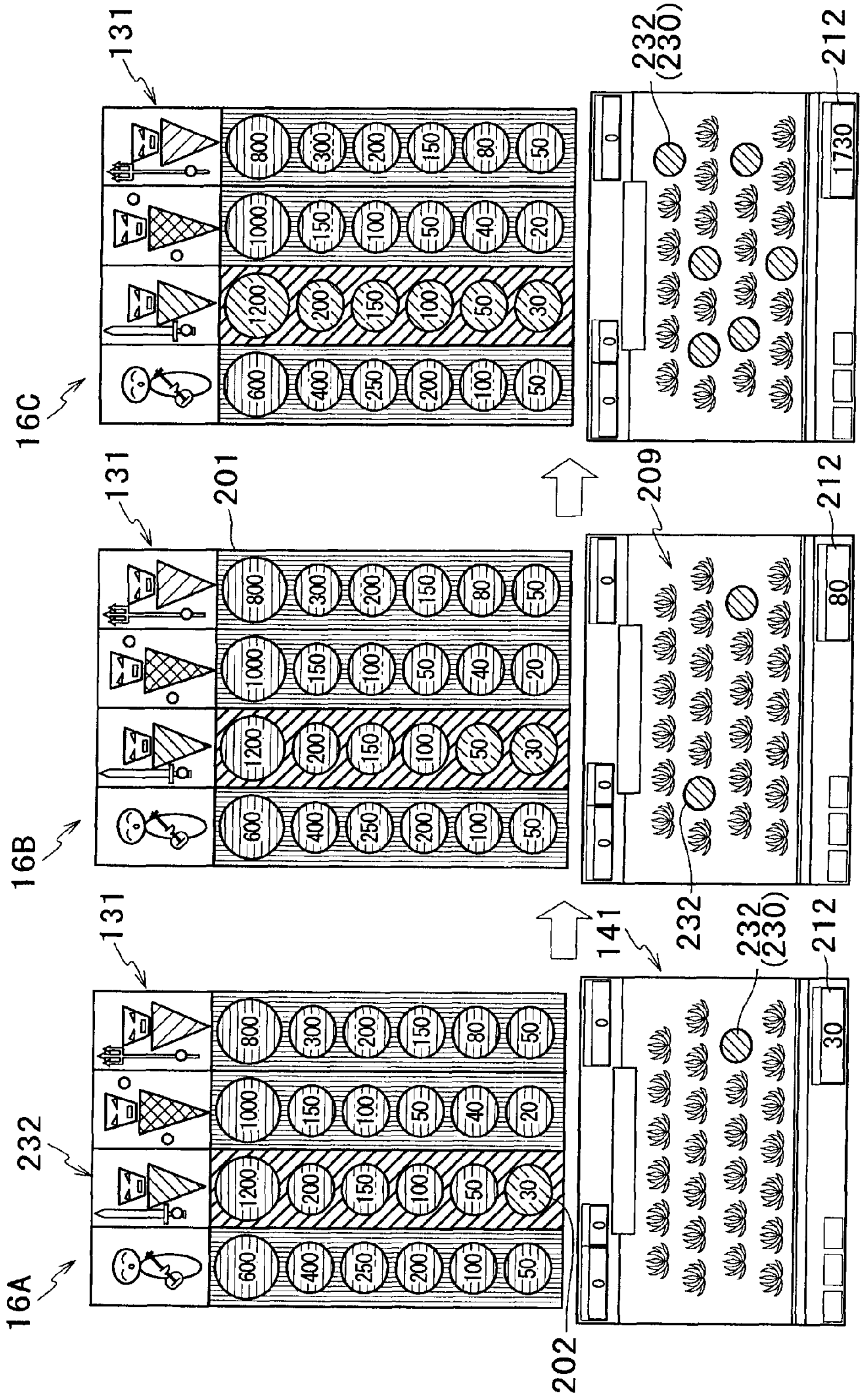
FIG. 16 is a first explanatory diagram showing an exemplary image to be displayed on the upper image display panel and the lower image display panel in the pickup bonus game.
Figure 17:
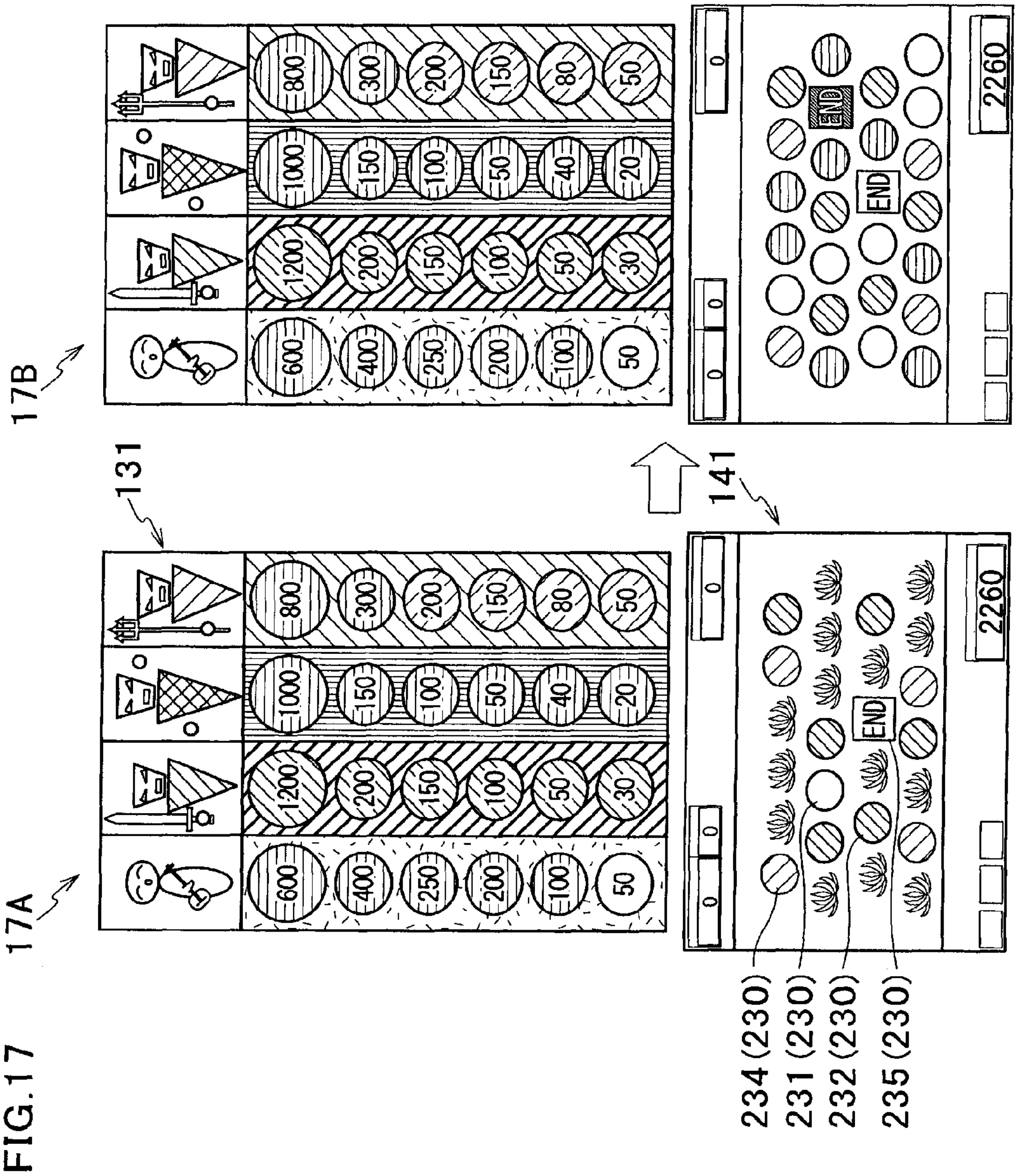
FIG. 17 is a second explanatory diagram showing an exemplary image to be displayed on the upper image display panel and the lower image display panel in the pickup bonus game.
Figure 18:
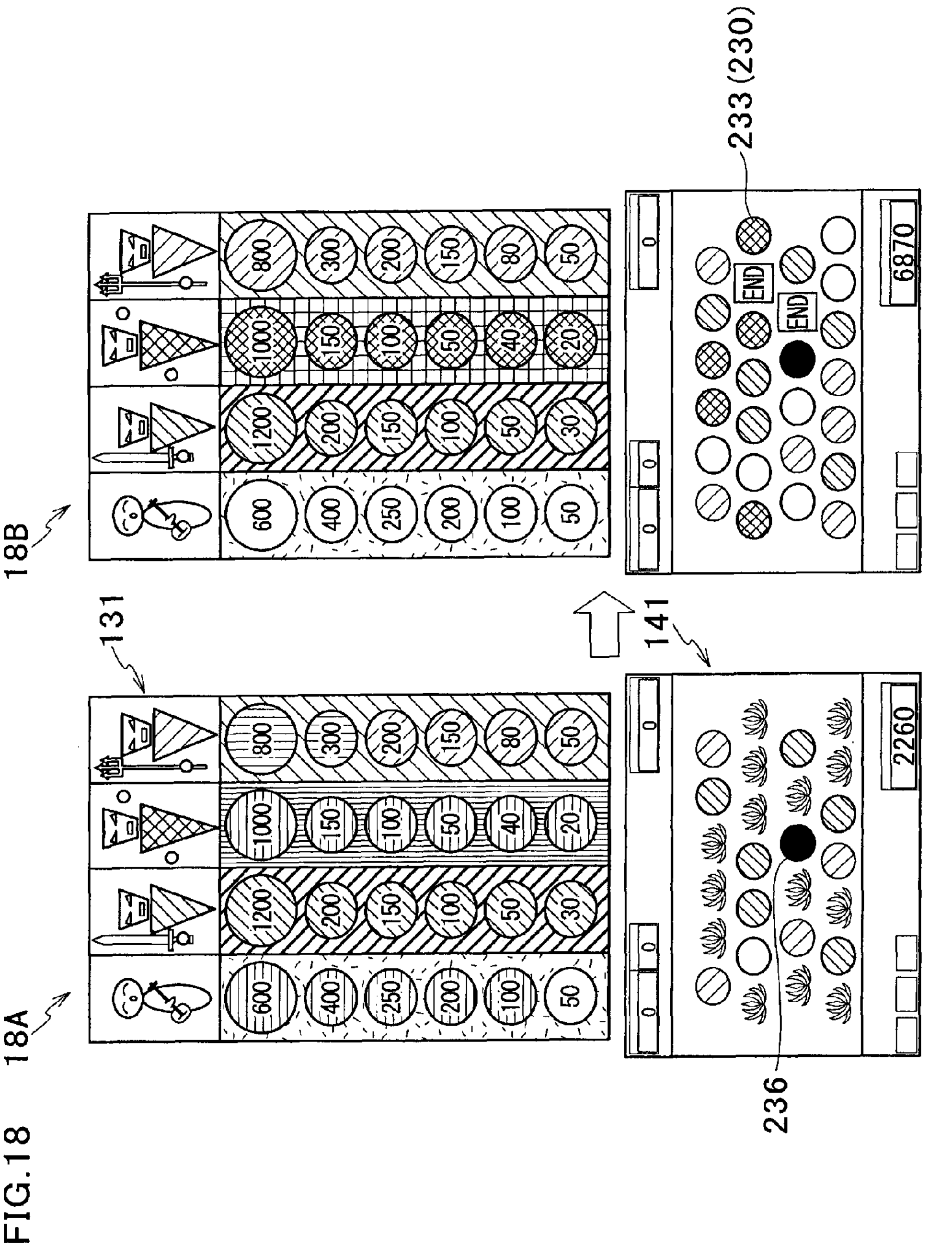
FIG. 18 is a third explanatory diagram showing an exemplary image to be displayed on the upper image display panel and the lower image display panel in the pickup bonus game.

The pickup bonus game payout table 192 is a table storing payout data read out and referred to in a later-described pickup bonus game process. As shown in FIG. 10 and FIG. 15, the table indicates a payout for each type of object 230 and the number of the same type of objects 230 associated with the lotus images 210 (selection objects) having been selected. There are six types of objects 230 in the present embodiment which are displayed on the lower image display panel 141 as visually identifiable images. These six types of objects 230 are: "white orb" 231, "blue orb" 232, "red orb" 233, "green orb" 234, "END" 235, and "black orb" 236. In the pickup bonus game process, after any of the lotus images 210 is selected a plurality of number of times, a value (payout data) corresponding to the number of selected lotus images 210 associated with the objects 230 is read out from the pickup bonus game payout table 192 stored in the RAM 73 to determine the payout. The payout thus determined is then awarded. For example, suppose a selection of a lotus image 210 is made four times, and three white orbs and one blue orb are selected as a result. With reference to the pickup bonus game payout table 192, a total payout for the three lotus images 210 associated with the white orbs 231 (objects 230) which is 350 credit (50+100+200) and a payout for selecting one lotus image 210 associated with the blue orb 232 which is 30 credit are calculated out. Then, a total of these payouts thus calculated out which is 380 credit is awarded.

As shown in FIG. 10, in the pickup bonus game payout table 192, the payout amount is set for each of the six types of the objects 230 in such a manner that the payout varies depending on the type and the number of the objects 230. For example, where the number of selected objects 230 of the same type is two, the amount of payout is 100 credit for the white orbs 231, 50 credit for the blue orbs 232; and 20 credit for the red orbs 233, and 80 credit for the green orbs 234. Further, the payout for each type of object 230 is increased according to the number of the objects 230. For example, in cases of blue orb 232, the amount of payout is 30 credit for one blue orb 231, 50 credit for two blue orbs 231, 100 credit for three blue orbs 231, 150 credit for four blue orbs 231, 200 credit for five blue orbs 231, and 1200 credit for six blue orbs 232. The amount of payout is increased according to the number of the blue orbs 232.

When comparing the payouts for a predetermined number of objects 230, one type of objects 230 out of the six types is associated with a less payout than that for another type of objects 230. This relation however may be the other way around at a certain number of objects 230 which is greater than the predetermined number (by a certain amount). That is, when comparing the payouts for the certain number of objects 230, the one type of objects 230 may be associated with a higher payout than that for the other type of objects 230. For example, when comparing the payout for two blue orbs 232 (the predetermined number of one type of objects 230) and that for two white orbs 231 (the predetermined number of the other type of objects 230), the amount of payout associated with two blue orbs 232 (the one type of objects 230) is 50 credit whereas that associated with two white orbs 231 is 100 credit. As such, the amount of payout associated with the two blue orbs 232 is less than that associated with the two white orbs 231. However, when comparing the payouts for six objects 230 (the certain number of objects 230) the number of which is greater than the predetermined number by four, the amount payout associated with six blue orbs 232 is 1200 credit and greater than the payout of 600 credit associated with six white orbs 231.

Further, when an object 230 of END 235 is selected, a payout of 50 credit is awarded and then selection making of the lotus images 210 is ended. In short, END 235 triggers termination of the pickup bonus game. Further, when the selected object 230 is a black orb 236 (special object), the objects 230 of all the lotus images 210 are displayed and all the objects 230 are regarded as to be selected. That is, a total of every payout in the pickup bonus game payout table 192 will be awarded. Note that the black orb 236 also serves as a trigger for terminating the pickup bonus game.

(Contents of Program)

Next, the program to be executed by the slot machine 10 is described.

(Main Control Process)

Figure 11:
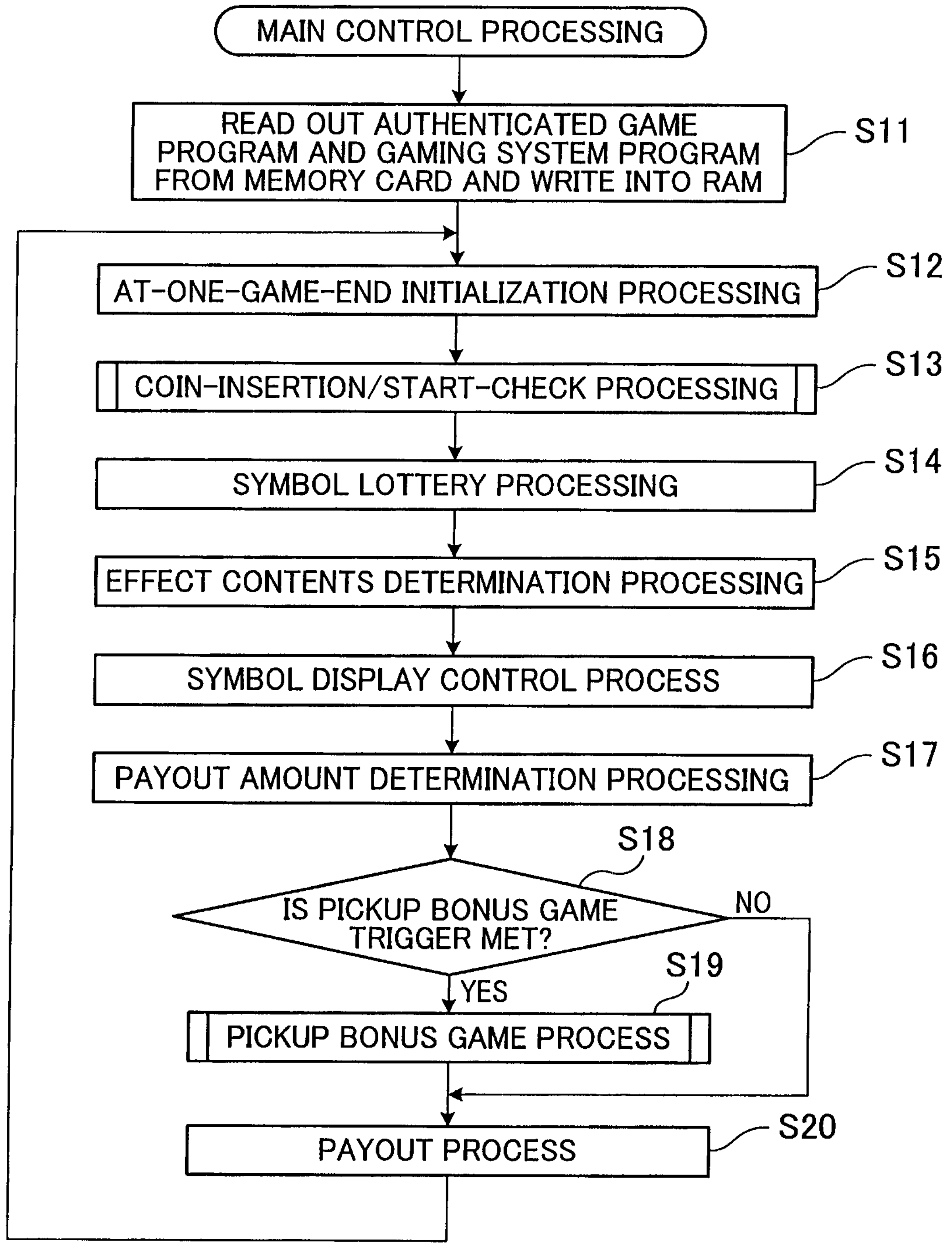
FIG. 11 is a flowchart of a main control process of the slot machine of the embodiment.

First, with reference to FIG. 11, main control process is described.

First, when the power is supplied to the slot machine 10, the main CPU 71 reads the authenticated game program and game system program from the memory card 54 through the gaming board 50, and writes the programs into the RAM 73 (S11).

Next, the main CPU 71 executes at-one-game-end initialization process (S12). For example, data that becomes unnecessary after each game in the working areas of the RAM 73, such as the number of BETs and the symbols randomly determined, is cleared.

The main CPU 71 executes coin-insertion/start-check process which is described later with reference to FIG. 13 (S13). In this process, an input check or the like is executed for the 1-bet switch 34S, the 2-bet switch 35S, the 3-bet switch 37S, the 5-bet switch 38S, the 10-bet switch 39S, the play-2-lines switch 40S, the play-10-lines switch 41S, the play-20-lines switch 42S, the play-30-lines switch 43S, the max lines switch 44S, the start switch 46S, or the like.

The main CPU 71 then executes symbol random determination process (S14). In the process, to-be stopped symbols are determined based on the random numbers for symbol determination.

Specifically, the main CPU 71 first samples random numbers for symbol determination. The main CPU 71 then randomly determines to-be stopped symbols for the respective video reels 151-155 (S112). The main CPU 71 executes random determination for each of the video reels 151-155, and determines any one of the 22 symbols as a to-be stopped symbol.

The main CPU 71 executes an effect contents determination process (S15). The main CPU 71 extracts a random value for effect, and randomly determines any of the effect contents from the preset plurality of effect contents.

Figure 12:
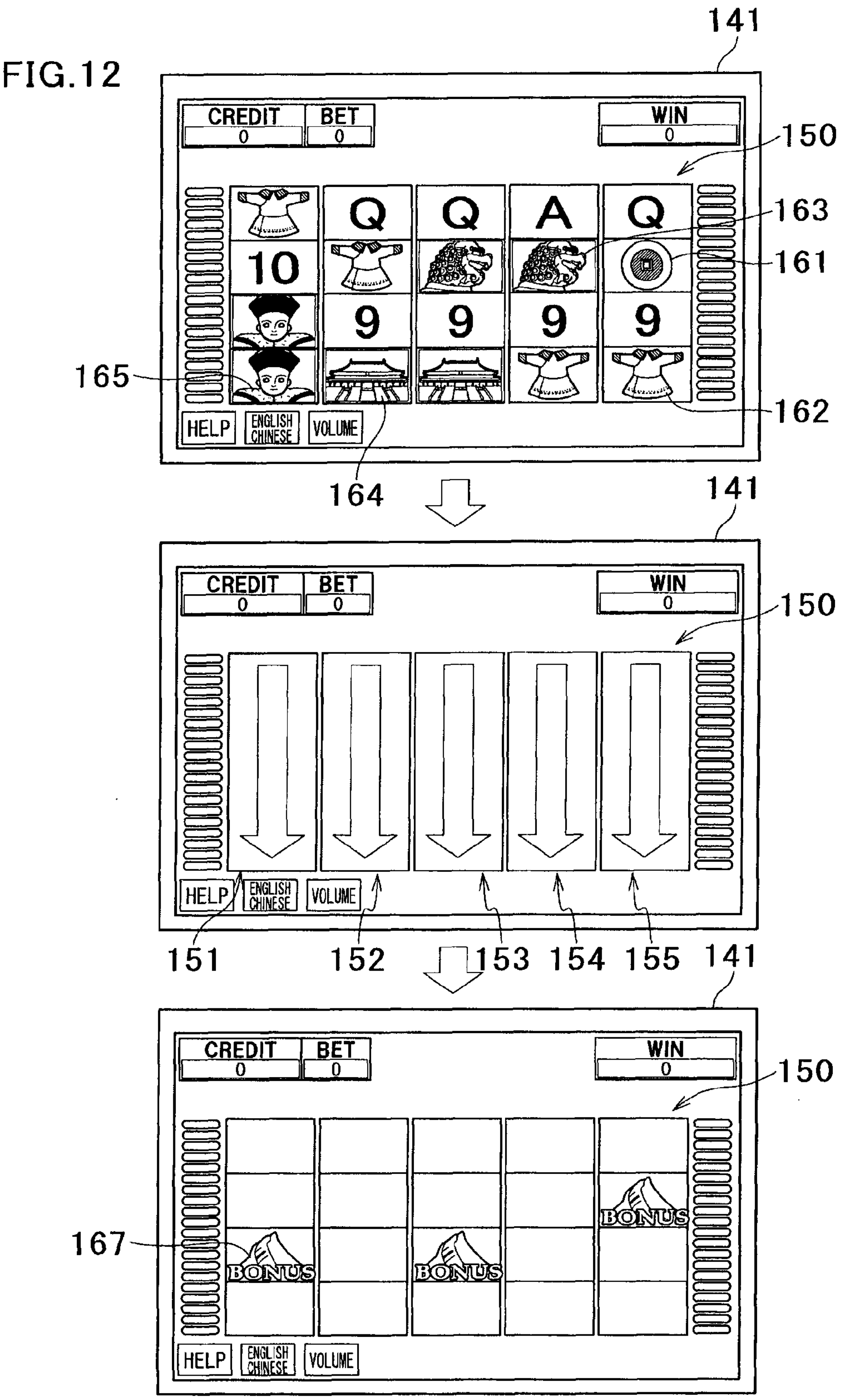
FIG. 12 is a diagram showing an exemplary image to be displayed on the lower image display panel provided to the slot machine of the embodiment.

Next, the main CPU 71 executes the symbol display control process (S16). In the process, scrolling of the symbol column of each video reel 151-155 is started, and the to-be stopped symbol determined in the symbol random determination process of S14 is stopped at a predetermined position (e.g. the upper area in the display window 150), as shown in FIG. 12. That is, twenty symbols including the to-be stopped symbol are displayed in the display window 150.

The main CPU 71 then executes the payout determination process (S17). In this process, the payout determination table 191 in the RAM 73 is referred to, and the payout amount is determined based on a combination of the symbols displayed on an active payline 300, and the payout amount thus determined is stored in the payout amount storage area in the RAM 73.

Next, the main CPU 71 determines whether or not a pickup bonus game trigger is met (S18). As shown in FIG. 12, the trigger of the present embodiment for causing a shift to the pickup bonus game is established when three or more "BONUS" symbols 167 are stopped in the display window 150. The main CPU 71, when determining that the pickup bonus game trigger has been met, executes the pickup bonus game process (S19).

Next, the main CPU 71, when determines that the pickup bonus game trigger has not been met after S19 or in S18, executes the payout process (S20). The main CPU 71 adds the value stored in the payout amount storage area to the value stored in the credit amount storage area provided in the RAM 73. Note that it is possible to drive the hopper 113 based on an input to the collect switch 32S, and output coins to the coin tray 18 according to the value stored in the payout amount storage area. After the process has been executed, the process shifts to S12.

The game run through S12 to S20 of the main control process corresponds to the base game of the present invention.

(Coin-Insertion/Start-Check Process)

Figure 13:
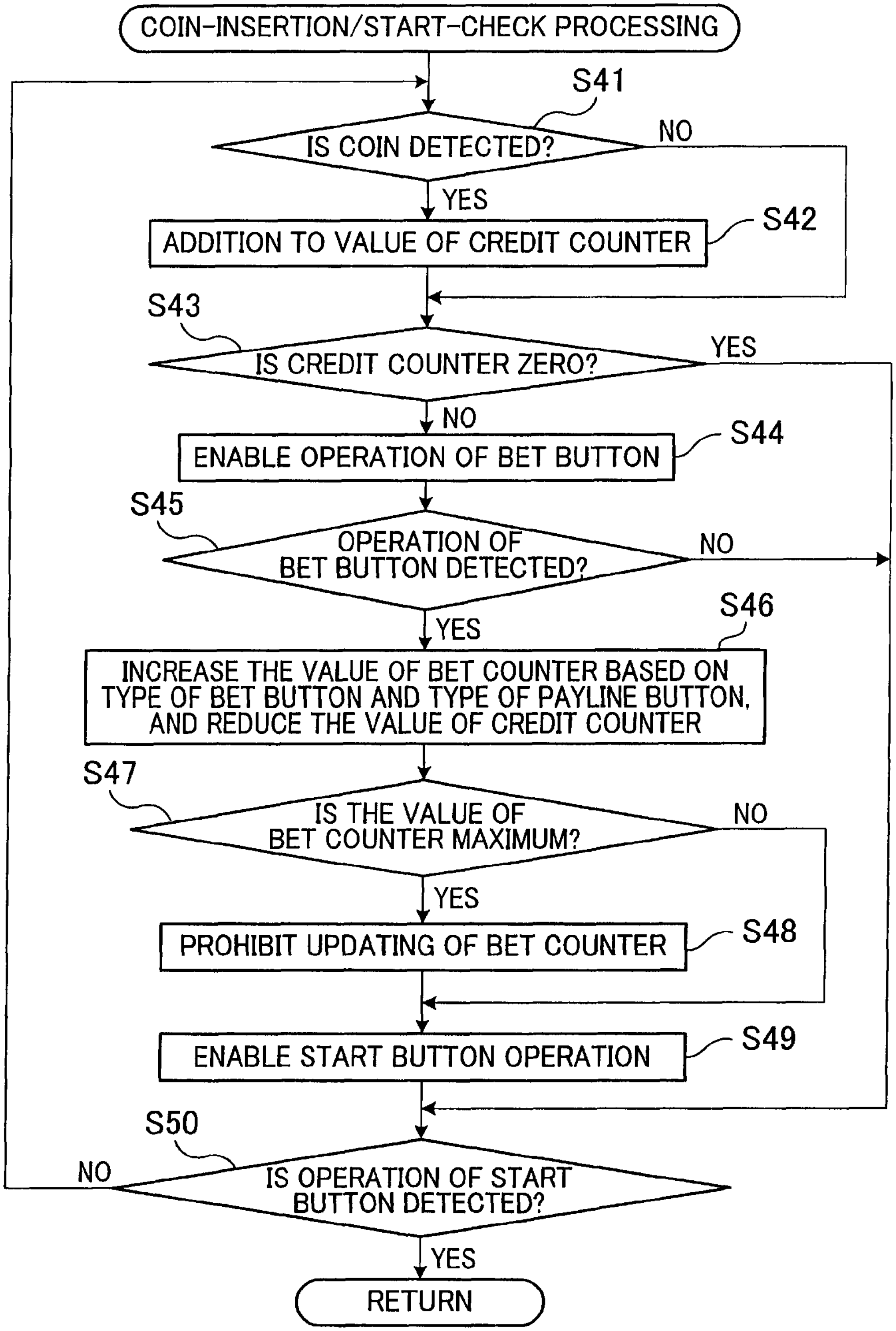
FIG. 13 is a flowchart of a coin-insertion/start-check process of the slot machine of the embodiment.
Figure 14:
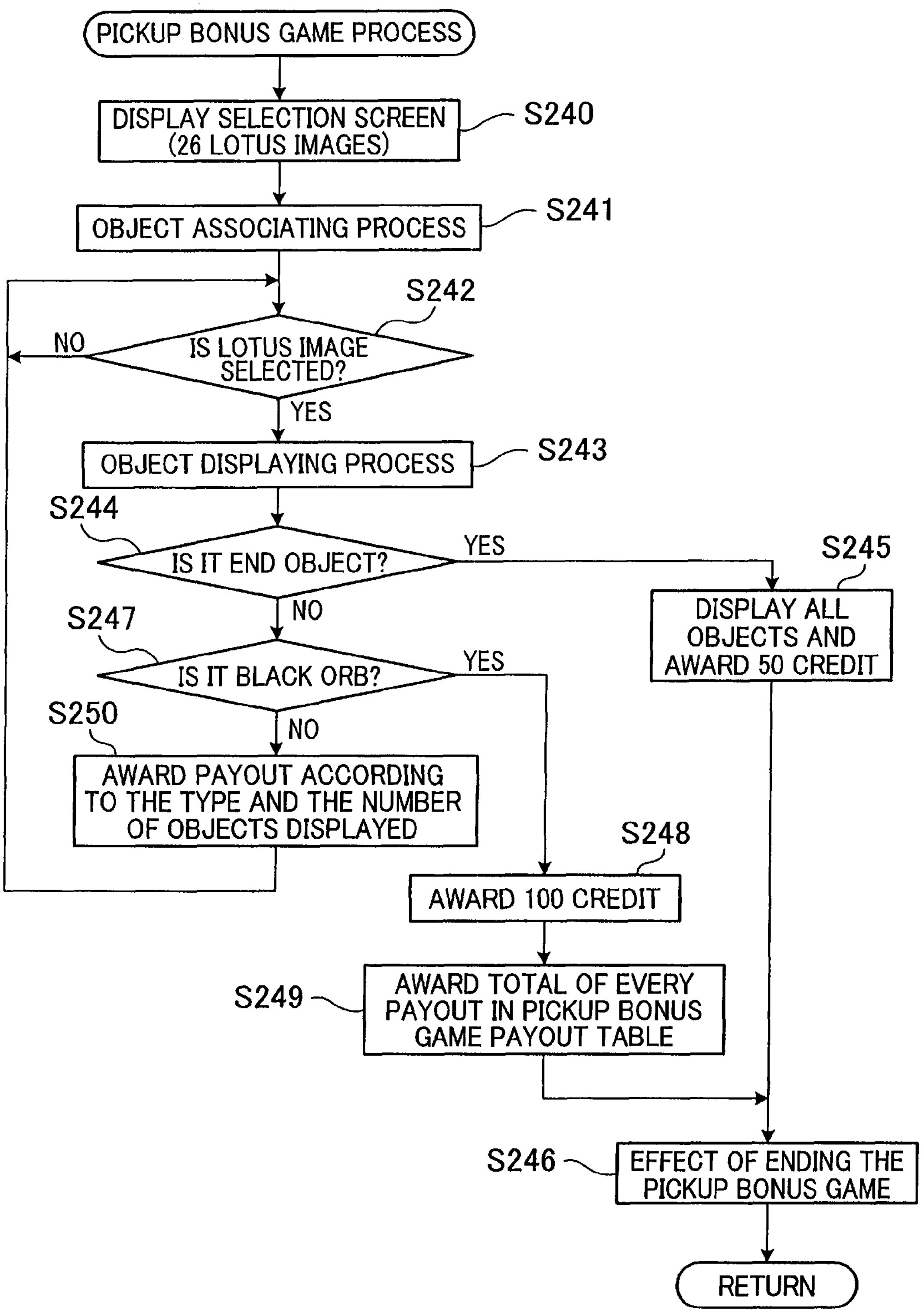
FIG. 14 is a flowchart of a pickup bonus game process of the slot machine of the embodiment.

Next, with reference to FIG. 13, coin-insertion/start-check process is described.

First, the main CPU 71 determines whether or not insertion of a coin has been detected by the coin counter 92C (S41). When determining that the insertion of a coin has been detected by the coin counter 92C, the main CPU 71 makes an addition to the value stored in the credit amount storage area (S42). It is to be noted that the main CPU 71 may determine whether or not insertion of a bill has been detected by the bill entry 115, and when determining that the insertion of a bill has been detected, the main CPU 71 may add a value according to the bill to the value stored in the credit amount storage area.

After S42 or when determining in S41 that the insertion of a coin has not been detected, the main CPU 71 determines whether or not the value stored in the credit amount storage area is zero (S43). When the main CPU 71 determines that the value stored in the credit amount storage area is not zero, the main CPU 71 permits operation acceptance of the bet buttons (1-bet button 34, 2-bet button 35, 3-bet button 37, 5-bet button 38, 10-bet button 39) (S44). Note that, in S44, an operation of the payline button (play-2-lines button 40, play-10-lines button 41, play-20-lines button 42, play-30-lines button 43, max lines button 44) is enabled. Operation of the payline button enables activation of a desirable number of paylines 300.

Next, the main CPU 71 determines whether or not operation of any of the BET buttons has been detected (S45). When the main CPU 71 determines that the bet switch (1-bet switch 34S, 2-bet switch 35S, 3-bet switch 37S, 5-bet switch 38S, 10-bet switch 39S) has detected press of the BET button by the player, the main CPU 71 makes an addition to a value stored in a bet amount storage area provided in the RAM 73 and makes a subtraction from the value stored in the credit amount storage area, based on the type of the bet button and the type of the payline button (S46).

The main CPU 71 then determines whether or not the value stored in the bet amount storage area is at its maximum (S47). The main CPU 71, when determining that the value stored in the bet amount storage area is the maximum value, prohibits updating of the value stored in the bet amount storage area (S48). After S48 or when determining in S47 that the value stored in the bet amount storage area is not at its maximum, the main CPU 71 permits operation acceptance of the start button 46 (S49).

After S49 or when determining in S45 that the operation of any of the BET buttons has not been detected, or when determining in S43 that the value stored in the credit amount storage area is zero, the main CPU 71 determines whether or not operation of the start button 46 has been detected (S50). The main CPU 71 shifts the process to S41, when determining that no operation of the start button 46 is detected.

When the main CPU 71 determines that the operation of the start button 46 has been detected, the coin-insertion/start-check process is ended.

(Pickup Bonus Game Process)

Next, the following describes the pickup bonus game process with reference to FIG. 14 to FIG. 18. The pickup bonus game process is executed on condition that three or more "BONUS" symbols 167 are displayed in the display window 150 in the main control process, as shown in FIG. 12 (S19).

First as shown in FIG. 15, the main CPU 71 displays on the lower image display panel 141 a selection screen 209 including 26 lotus images 210 (selection objects) (S240). At this time, as shown in FIG. 15, the main CPU displays a parameter image 201 on the upper image display panel 131. The parameter image 201 expresses in the form of circular gauges 202 payout amounts corresponding to the types of objects 230 (white orb 231, blue orb 232, red orb 233, green orb 234) and the number of objects 230 (1 to 6) in the pickup bonus game payout table 192.

Next, the main CPU 71 executes an object associating process (S241). In this process, the main CPU 71 randomly associates any one of the following object 230 with each of the 26 lotus images 210: six white orbs 231, six blue orbs 232, six red orbs 233, six green orbs 234, and two ENDs 235.

Next, the main CPU 71 displays in the selection screen 209 an image (In the present embodiment, an image of text reading "please select lotus") which prompts the player to select one lotus image 210 out of the 26 lotus images 210. Then, there is determined whether or not any one of the 26 lotus images 210 in the selection screen 209 is selected (S243). Specifically, the main CPU 71 determines whether or not a portion of the touch panel 114 corresponding to any of the lotus images 210 is touched. When it is determined that no lotus image 210 has been selected (S242: NO), the main CPU 71 causes the process to return to S242.

On the other hand, when it is determined that a lotus image 210 has been selected (S242: YES), an object displaying process is executed (S243). In this process, the main CPU 71 displays an object 230 associated with the lotus image 210 having been selected. For example, as shown in 16A of FIG. 16, when the player selects a lotus image 210 on the right end, second from the bottom on the touch panel 114, a blue orb 232 which is the object 230 associated with this lotus image 210 is displayed. At this time, in the parameter image 201 of the upper image display panel 131, a gauge 202 (showing text reading 30 credit) corresponding to the object 230 of one blue orb 232 is lighted in blue as shown in 16A of FIG. 16.

Next, the main CPU 71 determines whether or not the object 230 displayed is END 235 (S244). When it is determined that the object 230 displayed is END 235 (S244: YES) (see 17A of FIG. 17), the objects 230 of all the non-selected lotus images 210 are displayed (see 17B of FIG. 17). Then, with reference to the pickup bonus game payout table 192, a payout of 50 credit corresponding to one END 235 is awarded (S245). Then, the main CPU 71 displays a total amount of payout won in the pickup bonus game process on the lower image display panel 141, and provides an effect of ending the pickup bonus game (S246). The pickup bonus game process is ended thereafter.

On the other hand, when it is determined that the object 230 displayed is not the END 235 (S244: NO), the main CPU 71 determines whether or not the object 230 of the black orb 236 is displayed (S247). When it is determined that the object 230 displayed is not the, black orb 236 (S247: NO), the main CPU 71 refers to the pickup bonus game payout table 192 and awards a payout corresponding to the type of the object 230 associated with the selected lotus image 210 and the number of the same objects 230 (S250). For example, as shown in 16B of FIG. 16, suppose one blue orb 232 is already displayed in the selection screen 209, and suppose the player selects the lotus image 210 which is the second from the top and the second from the left end. When the object 230 associated with this lotus image 210 is the blue orb 232, the pickup bonus game payout table 192 is referred to and a payout of 50 credit corresponding to two blue orbs 232 is awarded. This amount is added to a total of the payouts awarded during the pickup bonus game process and displayed on the bonus payout display area 212.

The process then returns to S242. As described, S242, S243, S244, S247, and S250 are looped until the object 230 of the END 235 is displayed in S244 or the object 230 of the black orb 236 is displayed in S247. For example, when six blue orbs 232 are selected as the result of repeating selection making of the lotus image 210 in S242, as shown in 16C of FIG. 16, a total payout of 1730 credit (30+50+100+150+200+1200) is awarded. This amount is added to the value displayed in the bonus payout display area 212 and is displayed therein.

On the other hand, when the object 230 displayed is the black orb 236 (S247: YES), the pickup bonus game payout table 192 is referred to, and a payout of 100 credit which corresponds to one black orb 236 is awarded (S248).

Further, the main CPU 71 displays the objects 230 of all the lotus images 210, and awards a total amount of all the payouts in the pickup bonus game payout table 192, deeming that the all the objects 230 have been selected (S249). For example as shown in 18A of FIG. 18, when the object 230 corresponding to the selected lotus image 210 is the black orb 236, all the objects 230 are displayed as shown in 18B of FIG. 18. Then, there is calculated the total amount of all the payouts in the pickup bonus game payout table 192. That is, the sum of payouts is calculated for each type of objects 230. For the white orb 231, it is 1600 credit (50+100+200+250+400+600). For the blue orb 232, it is 1730 credit (30+50+100+150+200+1200). For the red orb 233, it is 1860 credit (20+40+50+100+150+1500). For the green orb 234, it is 1580 credit (50+80+150+200+300+800). These amounts are further added up and a total of 6770 credit is awarded as a net total payout. The main CPU 71 then displays on the lower image display panel 141 the total amount of payout having been won in the pickup bonus game process, and executes an effect of ending the pickup bonus game (S246). The pickup bonus game process is ended thereafter.

In the structure and/or the control method, when the base game run in the main control process shifts to the pickup bonus game, a player is able to select any of a plurality of lotus images 210 displayed in the selection screen 209 on the lower image display panel 141. In the pickup bonus game, a plurality of lotus images 210 and a plurality of objects (white orb 231, blue orb 232, red orb 233, green orb 234, END 235, or the like) are randomly associated with one another. After making a selection a plurality of number of times through the control panel 30 or the touch panel 114, a pickup bonus game payout table 192 storing a payout for each type and the number of objects is read out from the RAM 73, and a payout is determined according to the table. The payout thus determined is then awarded.

With this, the payout to be awarded for the pickup bonus game is determined based on the number of objects the player has selected. The player therefore is interested in the number of objects he/she has selected, while enjoying the pickup bonus game.

Further, the payouts in the pickup bonus game payout table 192 are set so as to increase according to the selected object (white orb 231, blue orb 232, red orb 233, green orb 234, END 235, or the like) (see FIG. 10). Further, for each of the types of the objects (white orb 231, blue orb 232, red orb 233, green orb 234, END 235), the payout amount varies according to the number of the objects (see FIG. 10). Further, the payouts are set as follows. Namely, for example, suppose two of the same type of objects have been selected. If these objects are two blue orbs 232, the payout is 50 credit. If these objects are two white orbs 231, the payout is 100 credit. Therefore, the payout for two blue orbs 232 is less than the payout for two white orbs 231. However, when comparing the payouts for six of the same objects, the payout for six white orbs 231 is 600 credit, whereas the payout for six blue orbs 232 is 1200 credit.

If the player selects a blue orb 232 and the number of the blue orb 232 is one to five, the payout awarded for selecting the blue orbs 232 is less than the payout which would have been awarded for selecting the same number of white orbs 231. However, if the blue orb 232 is further selected and the number of blue orbs 232 reaches six, the player is given a payout of 1200 credit which is higher than the payout of 600 credit which would have been awarded for selecting the same number of white orbs 231. Thus, when selecting the lotus images 210, a payout awarded for the number of objects selected may be low at one point. However, selecting more of the same type of objects will lead to a higher payout. The player therefore is still able to enjoy the pickup bonus game with an expectation for a higher payout. Further, the amount of increase in the payout varies depending on the type of objects. Therefore, there is a plurality of ways in which the player is motivated to select the lotus images 210, and the player is able to play the pickup bonus game with an enhanced expectation.

Further, when the black orb 236 (special object) is selected, the pickup bonus game payout table 192 is read out from the RAM 73, and all the payouts in the table are added up and awarded. As such, selecting the black orb 236 will yield a high payout. Therefore, the player is able to enjoy the pickup bonus game with a hope for selecting the black orb 236 every time he/she makes his/her selection.

Further in the present embodiment, if there are more than one type of objects (white orb 231, blue orb 232, red orb 233, green orb 234, END 235, or the like), a payout amount for each number of objects are read out from the pickup bonus game payout table 192 stored in the RAM 73 and added up for each type of the objects. The total payouts of all the types of objects are then added up and awarded as the net total payout. This way, even if more than one type of objects are selected, the player is able to obtain a payout for each type of objects according to the number of the same objects. The player is able to enjoy the pickup bonus game with an expectation for a high payout.

The above embodiment thus described solely serves as a specific example of the present invention, and the present invention is not limited to such an example. Specific structures of various means and the like may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process executed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine, comprising:

a display device which displays a plurality of selection objects in a pickup bonus game, each of the plurality of selection objects corresponding to at least one of a plurality of types of revealable objects;

a storage device which stores sets of payout data including:

a condition in which a type and a number of the type of the at least one of the plurality of types of revealable objects are associated with payouts, and a condition wherein a payout W corresponding to a predetermined number a of a revealable object A and a payout X corresponding to the predetermined number a of a revealable object B satisfy a relationship of W<X, and a payout Y corresponding to a predetermined number β of the revealable object A and a payout Z corresponding to the predetermined number β of the revealable object B satisfy a relationship of Y>Z;

an input device which enables an input of instruction; and a controller programmed to execute the following processes of:

(a1) running a base game in response to an input via the input device;

(a2) in the base game run in (a1), determining whether or not a condition for occurrence of the pickup bonus game is satisfied;

(a3) displaying the plurality of selection objects on the display device in the pickup bonus game, when it is determined in (a2) that the condition for occurrence of the pickup bonus game is determined as to be satisfied;

(a4) randomly associating each of the plurality of selection objects with at least one of the plurality of types of revealable objects;

(a5) receiving an input of selection of any of the plurality of selection objects displayed on the display device through the input device a predetermined number of times, the predetermined number of times being at least one;

(a6) after receiving an input of selection of the selection objects from among the plurality of selection objects the predetermined number of times in (a5), reading out from the storage device the payout data corresponding to the type and number of the at least one of the plurality of types of revealable objects that correspond to the selection objects selected via the input device the predetermined number of times in order to determine a payout; and, (a7) awarding the determined payout, and wherein the at least one of the plurality of types of revealable objects includes a special object;

the controller further executes the following process of:

when the special object is selected in (a5), displaying each of the revealable objects associated with each of the plurality of selection objects on the display device, reading out from the storage device payout data corresponding to all of the types and numbers of the revealable objects displayed on the display device and associated with each of the selection objects, and awarding a special payout.

2. The gaming machine according to claim 1, wherein:

in (a6), the payout data read out from the storage device to calculate the payout amount includes the types and the number of each of the plurality of types of revealable objects selected, and a total of payouts of each of the types and number of revealable object selected are added up to determine a net total payout, and the net total payout is awarded.

3. The gaming machine according to claim 1, wherein the number and type of the plurality of types of revealable objects corresponding to the plurality of selection objects selected is displayed on the display, and the payout amount based on the payout data read from the storage device is displayed on the display device.

4. The gaming machine according to claim 1, wherein when a selection object corresponding to a type of revealable object that terminates the pickup bonus game is selected, a payout amount is awarded based on the payout data read from the storage device.

5. A method of controlling a gaming machine comprising:

a display device which displays a plurality of selection objects in a pickup bonus game, each of the selection objects corresponding to at least one of a plurality of types of revealable objects;

a storage device which stores sets of payout data including:

a condition in which a type and a number of the type of the at least one of the plurality of types of revealable objects are associated with payouts, and a condition wherein a payout W corresponding to a predetermined number a of a revealable object A and a payout X corresponding to the predetermined number a of a revealable object B satisfy a relationship of W<X, and a payout Y corresponding to a predetermined number β of the revealable object A and a payout Z corresponding to the predetermined number β of the revealable object B satisfy a relationship of Y>Z;

an input device which enables an input of an instruction; and a controller, the method comprising the controller-executed steps of:

(b1) running a base game in response to an input via the input device;

(b2) in the base game run in (b1), determining whether or not a condition for occurrence of the pickup bonus game is satisfied;

(b3) displaying the plurality of selection objects on the display device in the pickup bonus game, when it is determined in (b2) that the condition for occurrence of the pickup bonus game is determined as to be satisfied;

(b4) randomly associating each of the plurality of selection objects with the at least one of the plurality of types of revealable objects;

(b5) receiving an input of selection of any of the plurality of selection objects displayed on the display device through the input device a predetermined number of times, the predetermined number of times being at least one;

(b6) after receiving an input of selection of the selection objects from among the plurality of selection objects the predetermined number of times in (b5), reading out from the storage device the payout data corresponding to the type and number of the at least one of the plurality of types of revealable objects that correspond to the selection objects selected via the input device the predetermined number of times in order to determine a payout; and, (b7) awarding the determined payout, and wherein the at least one of the plurality of types of revealable objects includes a special object;

the controller further executes the steps of:

when the special object is selected in (b5), displaying each of the revealable objects associated with each of the plurality of selection objects on the display device, reading out from the storage device payout data corresponding to all of the types and numbers of the revealable objects displayed on the display device and associated with each of the selection objects, and awarding a special payout.

6. The method of controlling the gaming machine of claim 5, wherein the number and type of the plurality of types of revealable objects corresponding to the plurality of selection objects selected is displayed on the display, and the payout amount based on the payout data read from the storage device is displayed on the display device.

7. The method of controlling the gaming machine of claim 5, wherein when a selection object corresponding to a type of revealable object that terminates the pickup bonus game is selected, a payout amount is awarded based on the payout data read from the storage device.

8. A gaming machine comprising:

a selection object display device configured to display a pickup bonus game when a predetermined condition is satisfied, the selection object display device displaying a plurality of selection objects corresponding to at least one of a plurality of types of revealable objects that are revealed upon selection of the selection objects;

a storage device configured to store, for each type of the plurality of revealable objects, payout data corresponding to a number and type of the revealable objects, wherein for each of one of a first type of revealable object and one of a second type of revealable object, a payout amount corresponding to the one of the first type of revealable object is greater than a payout amount corresponding to the one of the second type of revealable object, and wherein for a predetermined number or more, which is greater than one, of the first type of revealable object and the predetermined number or more of the second type of revealable object, a payout amount corresponding to the predetermined number or more of the first type of revealable object is less than a payout amount corresponding to the predetermined number or more of the second type of revealable object;

a payout table display configured to display a table of payout amounts corresponding to the number and type of each of the plurality of revealable objects revealed upon selection of the selection objects; and, a controller programmed to execute the processes of:

accumulatively storing in the storage device, the number and type of revealable objects revealed upon selection of the selection objects; and, calculating a total payout amount based on the payout data and the number and type of revealable objects revealed upon selection of the selection objects and accumulatively stored in the storage device, and wherein the at least one of the plurality of types of revealable objects includes a special object;

the controller further executes the following process of:

when the special object is selected, displaying each of the revealable objects associated with each of the plurality of selection objects on the display device, reading out from the storage device payout data corresponding to all of the types and numbers of the revealable objects displayed on the display device and associated with each of the selection objects, and awarding a special payout.

* * * * *